US012674974B2

(12) United States Patent　　　　　(10) Patent No.:　　US 12,674,974 B2
　　Tanaka et al.　　　　　　　　　　(45) Date of Patent:　　　Jul. 7, 2026

(54) OPTICAL DEVICE, RETINAL PROJECTION DISPLAY, AND HEAD-MOUNTED DISPLAY

(71) Applicants: Shu Tanaka, Osaka (JP); Akitoshi Mochida, Osaka (JP); Nobunari Tsukamoto, Osaka (JP)

(72) Inventors: Shu Tanaka, Osaka (JP); Akitoshi Mochida, Osaka (JP); Nobunari Tsukamoto, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 342 days.

(21) Appl. No.: 18/279,601

(22) PCT Filed: Mar. 15, 2022

(86) PCT No.: PCT/IB2022/052302
　　§ 371 (c)(1),
　　(2) Date: Aug. 31, 2023

(87) PCT Pub. No.: WO2022/200913
　　PCT Pub. Date: Sep. 29, 2022

(65) Prior Publication Data
　　US 2024/0142771 A1　　May 2, 2024

(30) Foreign Application Priority Data
　　Mar. 22, 2021　(JP) ................................. 2021-047768

(51) Int. Cl.
　　*G02B 26/10*　　　　(2006.01)
　　*G02B 5/32*　　　　(2006.01)
　　　　(Continued)

(52) U.S. Cl.
　　CPC ............. *G02B 26/101* (2013.01); *G02B 5/32* (2013.01); *G02B 26/0833* (2013.01); *G02B 27/0103* (2013.01); *G02B 27/0172* (2013.01)

(58) Field of Classification Search
　　CPC .... G02B 26/101; G02B 5/32; G02B 26/0833; G02B 27/0103; G02B 27/0172; G02B 2027/0107; G02B 27/0081
　　See application file for complete search history.

(56) References Cited

U.S. PATENT DOCUMENTS

2008/0151185 A1* 6/2008 Saito .................. G02B 27/0101
　　　　　　　　　　　　　　　　　351/206
2017/0212349 A1　　7/2017 Bailey et al.
　　　　　　　　　　(Continued)

FOREIGN PATENT DOCUMENTS

CN　　　105264423 A　　　1/2016
CN　　　109804296 A　　　5/2019
　　　　　　　(Continued)

OTHER PUBLICATIONS

International Search Report and Written Opinion issued on Jul. 11, 2022 in PCT/IB2022/052302 filed on Mar. 15, 2022, 14 pages.
　　　　　　　(Continued)

*Primary Examiner* — Marin Pichler
(74) *Attorney, Agent, or Firm* — XSENSUS LLP

(57)　　　　　ABSTRACT

An optical device includes: a light source to emit light; a light scanner to deflect the light emitted from the light source to scan an image formation object with the light through a light deflector; the light deflector to deflect the light emitted from the light scanner to the image formation object; a reflector between the light scanner and the image formation object; and a controller to control the light deflector to deflect the light emitted from the light scanner in a deflection direction and the light scanner to deflect the light emitted from the light source in a deflection direction different from the deflection direction of the light deflector.

12 Claims, 13 Drawing Sheets

(51) Int. Cl.
  *G02B 26/08*     (2006.01)
  *G02B 27/01*     (2006.01)

(56)           References Cited

U.S. PATENT DOCUMENTS

| | | | |
|---|---|---|---|
| 2018/0203234 | A1 | 7/2018 | Fiess et al. |
| 2019/0043392 | A1 | 2/2019 | Abele |
| 2022/0236563 | A1 * | 7/2022 | Tanaka ................. G02B 5/3008 |

FOREIGN PATENT DOCUMENTS

| | | | | |
|---|---|---|---|---|
| JP | 2008-145701 | A | 6/2008 | |
| JP | 2016-102812 | A | 6/2016 | |
| JP | 2019-211705 | A | 12/2019 | |
| JP | 2021-006895 | A | 1/2021 | |
| WO | 2016/134037 | A1 | 8/2016 | |
| WO | WO-2020261127 | A1 * | 12/2020 | ........... G02B 5/3025 |

OTHER PUBLICATIONS

Office Action issued Aug. 20, 2024 in Japanese Patent Application No. 2021-047768, 7 pages.
Office Action issued Mar. 23, 2026 in related Chinese Patent Application No. 202280022321.4.

* cited by examiner

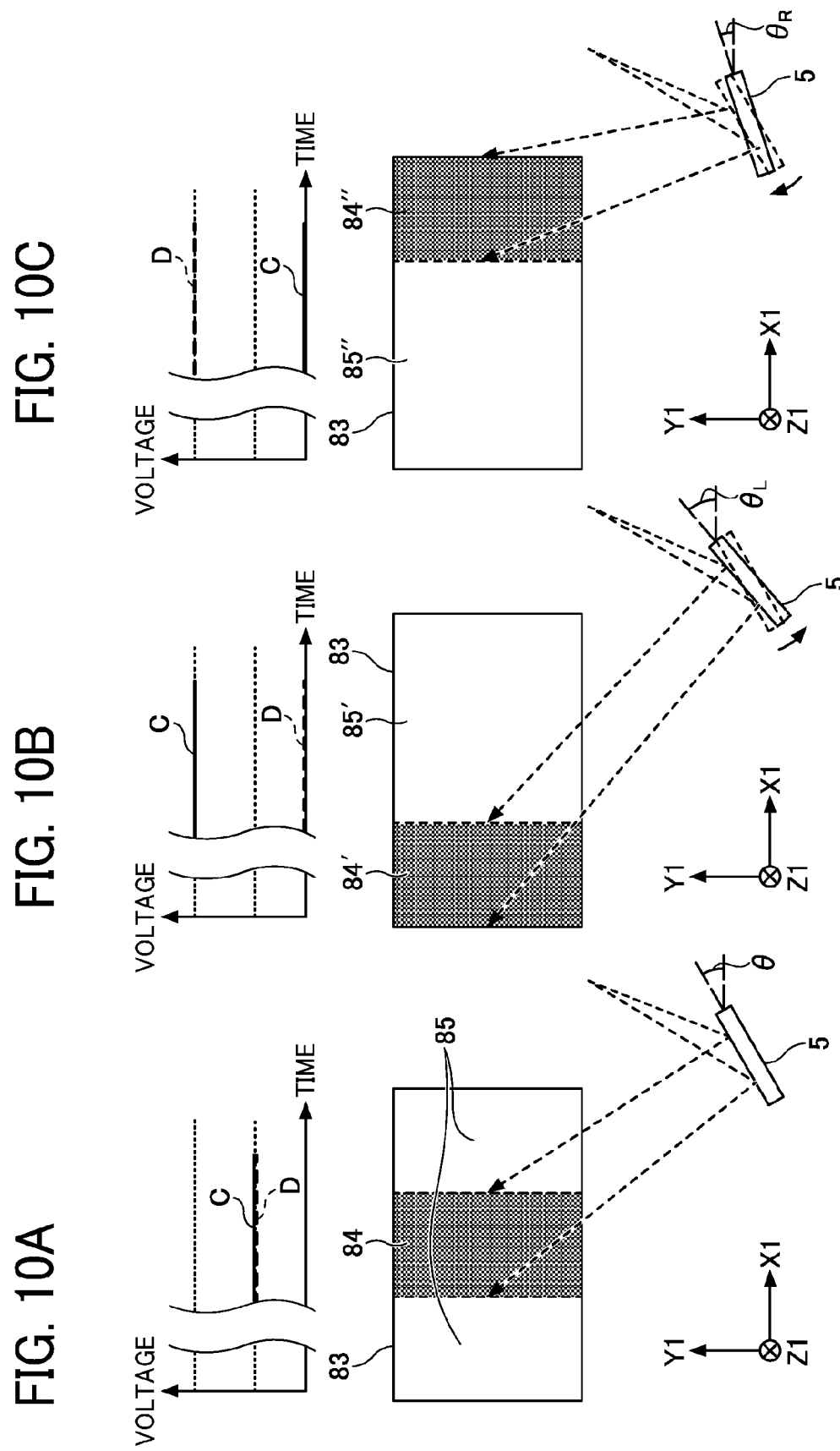

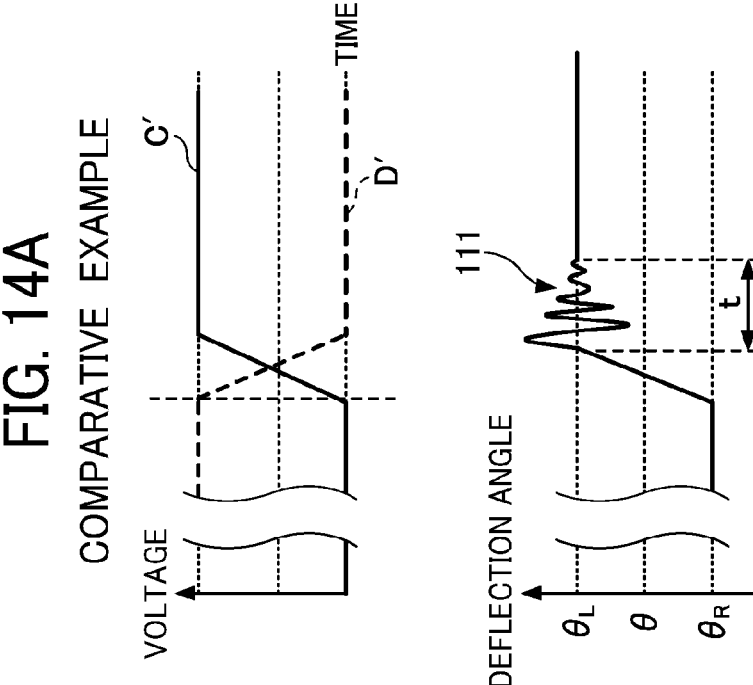

OPTICAL DEVICE, RETINAL PROJECTION DISPLAY, AND HEAD-MOUNTED DISPLAY

CROSS-REFERENCE TO RELATED APPLICATIONS

This application is based on PCT filing PCT/IB2022/052302, filed Mar. 15, 2022, which claims the priority to Japanese Patent Application No. 2021-047768, filed on Mar. 22, 2021, the entire disclosure of each is hereby incorporated by reference herein.

TECHNICAL FIELD

The present disclosure relates to an optical device, a retinal projection display, and a head-mounted display.

BACKGROUND ART

An optical device that includes a light source and a light scanner (scanning means) that deflects light emitted from the light source, and irradiates an image formation object with the light deflected is known. For example, in Japanese Patent No. 6769974, a wearable head-up display is disclosed. The wearable head-up display includes: a support structure mounted on a user's head in use; a laser-scanning projector held by the support structure; a holographic combiner held by the support structure and positioned in a field of view of one eye of a user when the support structure is mounted on the user's head; and an exit pupil selector held by the support structure and positioned in an optical path between the laser-scanning projector and the holographic combiner.

CITATION LIST

Patent Literature

[PTL 1]
Japanese Patent No. 6769974

SUMMARY OF INVENTION

Technical Problem

An aim of the present invention is to achieve both expansion of a viewing zone and high resolution of an image formed on an image formation object.

Solution to Problem

An optical device includes: a light source to emit light; a light scanner to deflect the light emitted from the light source to scan an image formation object with the light through a light deflector; the light deflector to deflect the light emitted from the light scanner to the image formation object; a reflector between the light scanner and the image formation object; and a controller to control the light deflector to deflect the light emitted from the light scanner in a deflection direction and the light scanner to deflect the light emitted from the light source in a deflection direction different from the deflection direction of the light deflector.

A retinal projection display includes the optical device.
A head-mounted display includes the optical device.

Advantageous Effects of Invention

Embodiments of the present invention enable an optical device, a retinal projection display, and a head-mounted display to achieve an increase in the viewing zone and an increase in the resolution of an image formed on an image formation object.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 10A is an illustration of a deflection mirror that deflects and projects light to a center of a surface to be scanned, according to the first embodiment.

FIG. 10B is an illustration of deflection mirror that deflects and projects light to a left portion of the surface according to the first embodiment.

FIG. 10C is an illustration of deflection mirror that deflects and projects light to a right portion of the surface according to the first embodiment.

FIG. 14A is an timing chart of time, voltage, and a deflection angle of the deflection mirror to which a second embodiment is not applied as a comparative example.

FIG. 14B is a timing chart of time, voltage, and deflection angle of deflection mirror to which the second embodiment is applied.

DESCRIPTION OF EMBODIMENTS

Figure 1:
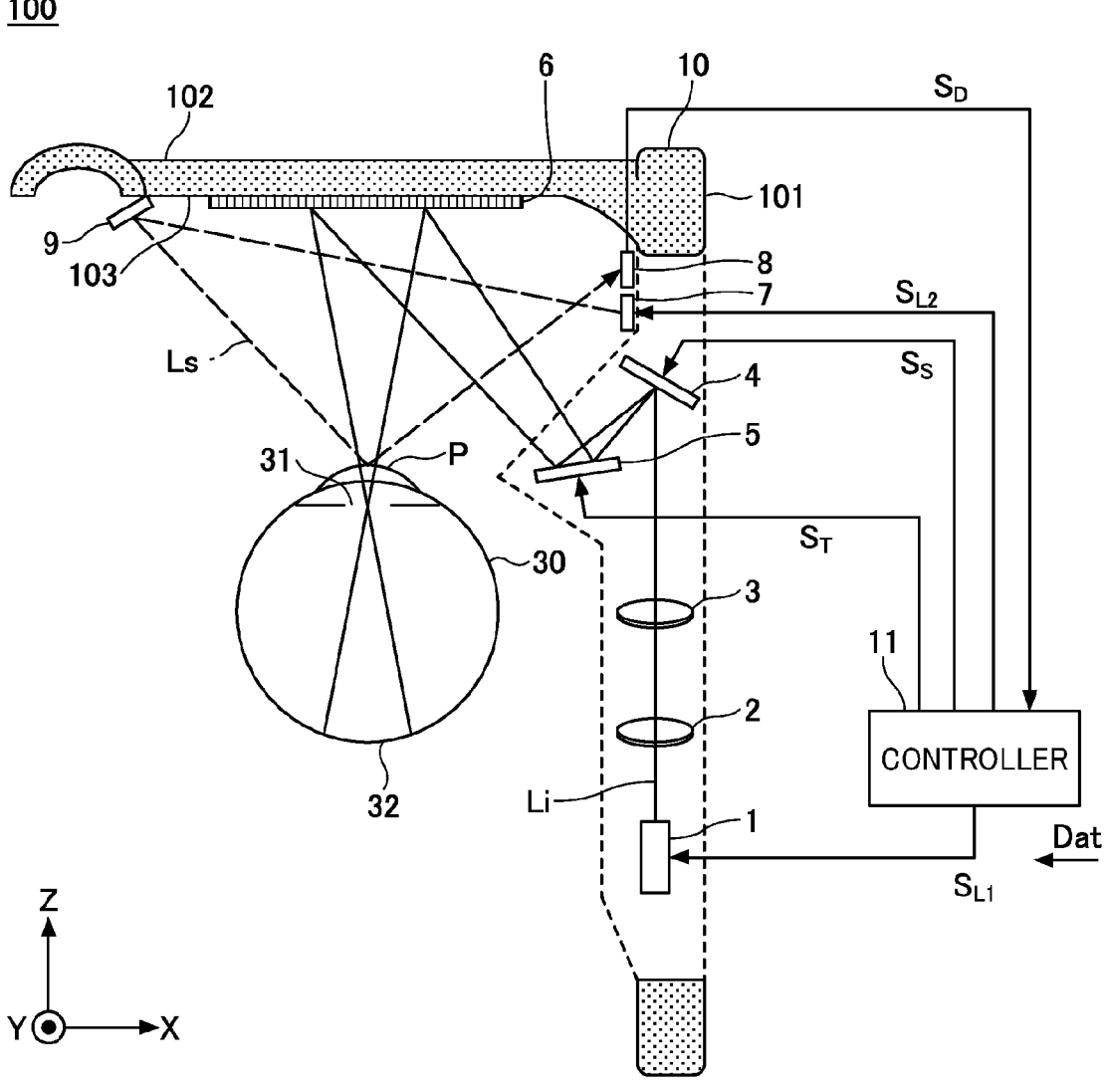
FIG. 1 is an illustration of an overall configuration of a retinal projection display according to a first embodiment.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described with reference to the drawings. In the drawings, the same components are denoted by the same reference number, and redundant description thereof will be appropriately omitted.

The embodiments described below are examples of an optical device for embodying the technical ideas of the present invention, and the present invention is not limited to the embodiments described below. The shapes of components, relative arrangements thereof, values of parameters, and the like described below are not intended to limit the scope of the present invention thereto but are intended to exemplify the embodiments of the present invention unless otherwise specified. The relative positions of the elements illustrated in the drawings may be exaggerated for purpose of clear illustration. As used herein, the term "connected/coupled" includes both direct connections and connections in which there are one or more intermediate connecting elements.

An optical device according to an embodiment includes a light source and a scanning mirror (i.e., light scanner, scanning means) that deflects light emitted from the light source, and irradiates an image formation object with the light deflected by the scanner. Examples of such an optical device includes a retinal projection display. A retinal projection display displays an image by projecting the image onto the retina through the eyeball of a user who wears the retinal projection display in front of the eye or on the head. Herein, the image includes a still image, a movie, or a video.

The optical device is not limited to the retinal projection display, and may be a display device such as a projector, a head-up display, or a head-mounted display, or may be an optical device other than the display.

An image formation object refers to an object on which an optical device forms an image. For example, in a retinal projection display, the image formation object is a human retina. The retinal projection display displays an image on the retina by forming the image on the retina.

In such an optical device, a range in which a user can visually recognize an image formed by scanning light may be limited. For example, in the retinal projection display, a range in which a user can visually recognize an image is limited by a viewing zone. Herein, the viewing zone represents a spatial region around the eyeball in which the user wearing the retinal projection display can move a sight line without losing an image. The viewing zone is also referred to as an eyebox.

When the user can visually recognize an image in a narrow range, the viewing zone is defined as a narrow viewing zone, and when the user can visually recognize an image in a wide range, the viewing zone is defined as a wide viewing zone. In a situation where the viewing zone is narrow, the user cannot visually recognize a part of the image because of a slight change in the sight line.

An optical device according to embodiments includes the light deflection mirror (i.e., light deflector, light deflection means) that deflects the light deflected by the light scanner so as to irradiate an image formation object with the light, and a reflector (reflecting means) disposed between the scanner and the image formation object. The optical device further includes a controller that controls the light scanner (light scanning means) and the light deflector. The light scanner deflects light in a direction different from a deflection direction of the light deflector, and the controller controls the deflection direction of the light deflector and the deflection direction of the light scanner.

Hereinafter, the terms "scan", "scans", "scanning", and "scanned" refer to continuously changing (i.e., continuously deflecting) the direction of irradiation of light (i.e., scanning light) at a regular interval of time. For example, an image is formed on an image formation object by the scanning light. Hereinafter, the terms "deflection", "deflect", "deflects", "deflecting", and "deflected" refer to changing the direction of irradiation of light discretely at irregular interval of time. For example, the light deflector changes a position of an image formed on the image formation object by deflecting the image formed by the scanning light.

In the embodiment, the deflection direction of the light deflector and the deflection direction of the light scanner are controlled by the controller, and the position of the image formed by the scanning light is changed, thereby achieving both an increase in the viewing zone and an increase in the resolution of the image formed on the image formation object.

Hereinafter, an embodiment is described in detail using a retinal projection display as an example of an optical device.

Hereinafter, directions may be indicated by an X-axis, a Y-axis, and a Z-axis in the drawings, and in the directions, an X-direction along the X-axis indicates a horizontal direction, a Y-direction along the Y-axis indicates a vertical direction, and a Z-direction along the Z-axis indicates a direction orthogonal to both the X-axis and the Y-axis in a state where the retinal projection display is worn by a user.

In addition, a direction indicated by an arrow in the X-direction is referred to as a +X-direction, a direction opposite to the +X-direction is referred to as a –X direction, a direction indicated by an arrow in the Y-direction is referred to as a +Y-direction, a direction opposite to the +Y-direction is referred to as a –Y-direction, a direction indicated by an arrow in the Z-direction is referred to as a +Z-direction, and a direction opposite to the +Z-direction is referred to as a –Z-direction. However, the ±X-directions, the ±Y-directions, and the ±Z-directions do not limit the orientation of the retinal projection display, and the retinal projection display may be oriented in any direction.

First Embodiment

Overall Configuration of Retinal Projection Display 100

An overall configuration of a retinal projection display 100 according to the first embodiment is described with reference to FIG. 1. A retinal projection display according to an embodiment is a wearable terminal (i.e., wearable device) and is a head mounted display (HMD) that forms or draws an image directly on the retina of a user by laser scanning according to the Maxwellian view.

In the embodiment, the retinal projection display for the eyeball of the right eye of the user is described as an example, but the same applies to the eyeball of the left eye. In some embodiments, two retinal projection displays may be provided for the eyeballs of the right eye and the left eye, respectively. The terms "laser light" and "a laser beam" in embodiments are used interchangeably, herein.

FIG. 1 is an illustration of the configuration of a retinal projection display 100 as an example. As illustrated in FIG. 1, the retinal projection display 100 includes an image laser light source 1 (i.e., light source), a lens 2, a lens 3, a scanning mirror 4 (a light scanner), a deflection mirror 5 (a light deflector), a projection optical element 6 (i.e., reflector or hologram), a detection laser light source 7 (i.e., a part of a detector), a light detection element 8 (i.e., another part of a detector), and a reflection element 9. The retinal projection display 100 includes an eyeglass frame 10 and a controller 11.

The eyeglass frame 10 includes a temple 101 and a rim 102, and an eyeglass lens 103 held by the rim 102. The image laser light source 1, the lens 2, the lens 3, the scanning mirror 4, the deflection mirror 5, and the controller 11 are provided inside the temple 101. The projection optical element 6 is provided on the surface of the eyeglass lens 103 held by the rim 102. The user wears the retinal projection display 100 on their head by putting the eyeglass frame 10 on their ears.

The image laser light source 1 is a semiconductor laser that emits an image laser beam $L_i$ having a single wavelength or multiple wavelengths. The image laser light source 1 is an example of a light source. When a monochrome image is displayed, a laser light source that emits the image laser beam $L_i$ having a single wavelength is used as the image laser light source 1. When a color image is displayed, multiple laser light sources that emit laser beams having multiple wavelengths such as a red semiconductor laser, a green semiconductor laser, and a blue semiconductor laser, are used as the image laser light source 1. The image laser light source 1 emits the image laser beam $L_i$ in response to a formation drive signal $S_{L1}$ from the controller 11.

The light intensity of the image laser beam $L_i$ emitted from the image laser light source 1 is limited to light intensities within a range without compromising safety of the user's eyes. Depending on the situation, an optical element (e.g., an attenuator or a neutral density filter) that reduces the light intensity of the laser beam may be incorporated into the image laser light source 1.

In addition, at least one photodiode may be disposed in the image laser light source 1, and the light intensity of the emitted image laser beam $L_i$ may be monitored so as to prevent the light intensity from exceeding an appropriate light intensity within the range without compromising the safety of the eyes of the user.

The appropriate light intensities within the range without compromising the safety of the eyes of the user refers to a light intensity below Class 1 defined by the International Electrotechnical Commission (IEC) 60825-1, which is an international standard related to the safety of laser products. The image laser light source 1 is not limited to a semiconductor laser. A solid-state laser or a gas laser may be used as the image laser light source 1.

The scanning mirror 4 is a mirror that oscillates or rotates about two axes substantially orthogonal to each other and is an example of a scanner that continuously deflects the image laser beam $L_i$ emitted from the image laser light source 1. The scanning mirror 4 continuously deflects the image laser beam $L_i$ incident on the scanning mirror 4 (i.e., a reflection mirror 92a in FIG. 2) by regularly changing an angle of the reflection mirror 92a (i.e., oscillation) and forms an image displayed in one field of view on the retina 32 of the eyeball 30. The retina 32 is an example of an image formation object.

In the embodiment, the scanning mirror 4 scans with the incident image laser beam $L_i$ in the X-direction and the Y-direction. The X-direction in FIG. 1 corresponds to a main scanning direction in which pixels are drawn continuously in terms of time to form a series of pixel groups. The Y-direction in FIG. 1 is orthogonal to the main scanning direction and corresponds to a sub-scanning direction in which a series of pixel groups are formed. Scanning speed in the main scanning direction is set higher than scanning speed in the sub-scanning direction. An image is formed by a scanning image laser beam $L_i$.

The scanning mirror 4 is capable of discretely switching the deflection direction of the image light in n stages along the Y-direction under the control of the scanning drive signal $S_S$ and the position of the image formed on the retina 32, in which n is an integer of 1 or greater. In the present embodiment, an example is illustrated in which the deflection direction of image light is switched in three stages (i.e., n=3), but n is not limited to three, and n may be selected as appropriate. Herein, the image light is light to form an image.

As the scanning mirror 4, a two-axis micro-electromechanical system (MEMS) mirror may be used. The configuration of the scanning mirror 4 is described in detail with reference to FIG. 2, and the operation of the scanning mirror 4 is described in detail with reference to FIGS. 7A to 9B.

The deflection mirror 5 is disposed between the scanning mirror 4 and the projection optical element 6. The deflection mirror 5 deflects the image laser beam $L_i$ by tilting a reflection mirror 42a (in FIG. 3) of the deflection mirror 5. The deflection mirror 5 is an example of a light deflecting means that deflects the scanning image laser beam $L_i$ so as to irradiate the retina 32. The deflection mirror 5 switches the deflection direction discretely and selectively. The deflection mirror 5 oscillates around an axis along the Y-direction and is stopped and fixed at any one of m stages of a tilt by a deflection drive signal $S_T$, in which m is an integer of 1 or greater.

The deflected image light is emitted toward the projection optical element 6. The deflection mirror 5 switches the deflection direction of the image light deflected by the scanning mirror 4 in m stages along the X-direction. Herein, m is an integer of one or more. In the present embodiment, an example in which the deflection direction of the image light is switched in three stages (i.e., m=3) is illustrated, but m is not limited to three, and m is appropriately selected.

For example, a single-axis MEMS mirror may be used as a deflection mirror 5. The configuration of the deflection mirror 5 is described in detail with reference to FIG. 3, and the operation of the deflection mirror 5 is described in detail with reference to FIG. 10.

The projection optical element 6 is an example of a reflector mirror (i.e., light reflector) disposed between the deflection mirror 5 and the retina 32. The projection optical element 6 includes a holographic optical element that reflects and focuses the image laser beam $L_i$ emitted from the deflection mirror 5 onto the eyeball 30 of the user. The holographic optical element is an example of a light reflecting-condensing element and an example of a hologram. The holographic optical element is composed of at least one holographic film.

The projection optical element 6 includes x hologram regions having different focusing properties where x is an integer of two or more, obtained by multiplying n by m (i.e., x=m×n). The x hologram regions are optically recorded. Herein, n and m are integers of one or more. Thus, for example, when n is one, m is two, and when m is one, n is two. In the present embodiment, a configuration of the hologram regions in which x is nine is exemplified. However, x is not limited to nine, x may be appropriately selected.

Each hologram region focuses the image laser beam $L_i$ on different nine viewing zones in the vicinity of the pupil 31 of the eyeball 30. The nine viewing zones are positioned such that the image laser beam $L_i$ is included in the pupil 31 of the user's eye when the user views along the nine sight lines.

A material of the holographic film may be Bayfol® HX that is available from Bayer MaterialScience AG or a photopolymer film. A configuration and a function of the projection optical element 6 is described in detail with reference to FIG. 6.

The configuration in which the detection laser light source 7 and the light detection element 8 (e.g., photosensor) are provided is an example of a sight-line-direction detection unit that detects the direction of the sight line of a user wearing the retinal projection display 100. The detection laser light source 7 emits a detection laser beam $L_S$ to the eyeball 30. The light detection element 8 receives light that is the detection laser beam $L_S$ emitted from the detection laser light source 7 and reflected from the eyeball 30 and outputs a detection signal $S_D$ corresponding to the intensity of the received light to the controller 11. In other words, the detection laser light source 7 and the light detection element 8 detect inclination of the eyeball.

The controller 11 estimates the direction of the sight line of the user based on the detection signal $S_D$ and obtains information indicating the direction of the sight line (i.e., information of the sight line). In addition, the controller 11 controls a position at which an image is to be projected on the retina 32 according to the information on the sight line.

The detection signal $S_D$ is an example of positional information of projection or positional information of the image formation object to provide the projection position to the controller 11. The light detection element 8 is an example of projection position output means to output the projection position information or the image formation object position information to the controller 11. However, the configuration of the sight-line-direction detection unit is not limited to the configuration including the detection laser light source 7 and the light detection element 8. Any eye tracking technology may be applied to the sight line detection unit.

The detection laser light source 7 is a light source array such as a vertical cavity surface emitting laser (VCSEL) or a laser diode array (LDA) that emits the detection laser beam $L_S$ toward the cornea of the eyeball 30. The detection laser light source 7 includes nine light emitting members corresponding to nine fields of view for the nine viewing zones. The wavelength of the detection laser beam $L_S$ emitted from the detection laser light source 7 is preferably the wavelength of near-infrared light, which is non-visible light, so that the visual recognition of the user in which the sight line of the user detected is not obstructed. However, the wavelength of the detection laser beam $L_S$ is not limited to the wavelength of near-infrared light, and visible light may be used.

The light detection element 8 includes at least one photodiode that receives the detection laser beam $L_S$ that is emitted from x light emitting members of the detection laser light source 7, where x is an integer of 1 or greater, enters the eyeball 30 via the reflection element 9, and is reflected by the eyeball 30.

The cornea is the surface of the eyeball 30, which is transparent and watery and typically have a reflectance of about 2 to 4%. The detection laser beam $L_S$ incident on the eyeball 30 of the user is reflected by a region P of the corneal (surface of the eyeball 30), and reaches the light detection element 8 (i.e., photodetector). The detection laser beam $L_S$ is emitted from each of the x light emitting members included in the detection laser light source 7. The detection laser beam $L_S$ is received by the light detection element 8 when the user visually recognizes each field of view corresponding to a corresponding light emitting member.

The light detection element 8 is not limited to a photodiode. As the light detection element 8, an imaging element such as a CCD or a CMOS may be used to detect the detection laser beam $L_S$ by image processing based on a spatial intensity distribution of light incident on an imaging surface.

The controller 11 inputs image data Dat which is a source of an image to be formed, and controls emission of the image laser beam $L_i$ by the image laser light source 1 based on the image data Dat. In addition, nine light emitting members (i.e., x=9) of the detection laser light source 7 are sequentially turned on based on the detection drive signals $S_{L2}$ to control the emission of the detection laser beam $L_S$. In addition, based on the light emission timing of each light emitting member of the detection laser light source 7 and the detection signal $S_D$ from the light detection element 8, the sight line direction is estimated as to which field of view the sight line is directed among predetermined nine fields of view (i.e., x=9). Further, scanning of the image laser beam $L_i$ by the scanning mirror 4 is controlled by a scanning drive signal $S_S$ of the scanning mirror 4. Further, the tilt of the deflection mirror 5 is controlled by a deflection drive signal $S_T$ of the deflection mirror 5.

FIG. 1 is an illustration of the configuration of the image laser light source 1 provided inside the temple 101 as an example, but the configuration is not limited thereto. The image laser light source 1 may be provided outside the temple 101, and the image laser beam $L_i$ emitted from the image laser light source 1 may be guided to the inside of the temple 101. The controller 11 may be provided inside the temple 101 or outside the temple 101 so that each driving signal from the control 11 is fed into the temple 101.

FIG. 1 is an illustration of the configuration of the projection optical element 6 provided on the surface of the eyeglass lens 103 as an example, but the configuration is not limited thereto. The projection optical element 6 may be integrated with the eyeglass lens 103.

The scanning mirror 4 is not limited to a two-axis MEMS mirror and may apply a configuration of wo single-axis MEMS mirrors. An optical element capable of continuously deflecting light, such as a polygon mirror or a galvano mirror, may be used, or a combination thereof may be used. The use of the MEMS mirror is preferable because the retinal projection display 100 can be reduced in size and weight. A configuration using only a two-axis MEMS mirror is more preferable because the retinal projection display 100 can be reduced in size and weight. A driving method of the MEMS mirror may be any one of an electrostatic method, a piezoelectric method, and an electromagnetic method.

The deflection mirror 5 is not limited to the MEMS mirror, and an optical element such as a combination of an actuator and a mirror or a digital micromirror device (DMD)

may be used. The use of the MEMS mirror is preferable because the retinal projection display 100 can be reduced in size and weight.

The behavior of the image laser beam $L_i$ in the retinal projection display 100 is described with reference to FIG. 1.

In FIG. 1, the image laser beam $L_i$ which is divergent light emitted from an image laser light source 1 is converted into substantially parallel light by a lens 2 and shaped into a desired laser beam state by a lens 3. In FIG. 1, the configuration including the lens 2 and the lens 3 is illustrated as an example, but the lens 3 may not be provided as long as a desired laser beam state can be formed.

The imaging laser beam $L_i$ shaped into a desired beam state is continuously deflected along two axes by the scanning mirror 4, reflected by the deflection mirror 5, and reaches the projection optical element 6. FIG. 1 is an illustration of the configuration in which the deflection mirror 5 is disposed between the scanning mirror 4 and the projection optical element 6 as an example, but the configuration is not limited thereto. Alternatively, the scanning mirror 4 may be disposed between the deflection mirror 5 and the projection optical element 6, and the image laser beam $L_i$ reflected by the deflection mirror 5 may be continuously reflected along two axes by the scanning mirror 4 to reach the projection optical element 6.

The projection optical element 6 reflects the image laser beam $L_i$ toward the eyeball 30 of the user, and causes the image laser beam $L_i$ to enter the inside of the eyeball 30. The light that has entered the inside of the eyeball 30 is condensed in the vicinity of the center of the pupil 31 using the condensing properties of the hologram region of the projection optical element 6, before projected onto the retina 32 in the deep recess of the eyeball 30 to approximately form an image on the retina 32.

A visual recognition state described above is referred to as the Maxwellian view. In the Maxwellian view, since the image laser beam $L_i$ passing through the vicinity of the center of the pupil 31 reaches the retina 32 irrespective of the focus adjustment of the crystalline lens, it is generally understood that the user can clearly view the image formed on the retina 32 in a focused state even if the eye is focused on any position in the real space.

In reality, since the laser beam incident on the eyeball 30 has a finite diameter, which is small, a little influence of a lens function of the crystalline lens remains. For this reason, in the present embodiment, the diameter of the image laser beam $L_i$ incident on the eyeball 30 is designed to be larger than or equal to 350 μm and less than or equal to 500 μm by the focusing function of the projection optical element 6, and a beam spread angle is designed to be a positive finite value (i.e., divergent light).

As a result, the image formed by the image laser beam $L_i$ continuously deflected by the scanning mirror 4 reaches the retina 32 through the projection optical element 6 without being affected by the focus adjustment of the crystalline lens, so that the user can always clearly view the image focused on the retina 32 even if the eye is focused on any position in the real space. In other words, an image formed with the image laser beam $L_i$ scanned by the scanning mirror 4 is visually recognized by the user in a focus-free state.

The retinal projection display 100 can change the light intensity of the image laser beam $L_i$ to be emitted, by changing the current or voltage applied to the image laser light source 1. Thus, the brightness of an image can be adjusted according to the brightness of the surrounding environment in which the retinal projection display 100 is used.

An Example of Configuration of Scanning Mirror 4

Figure 2:
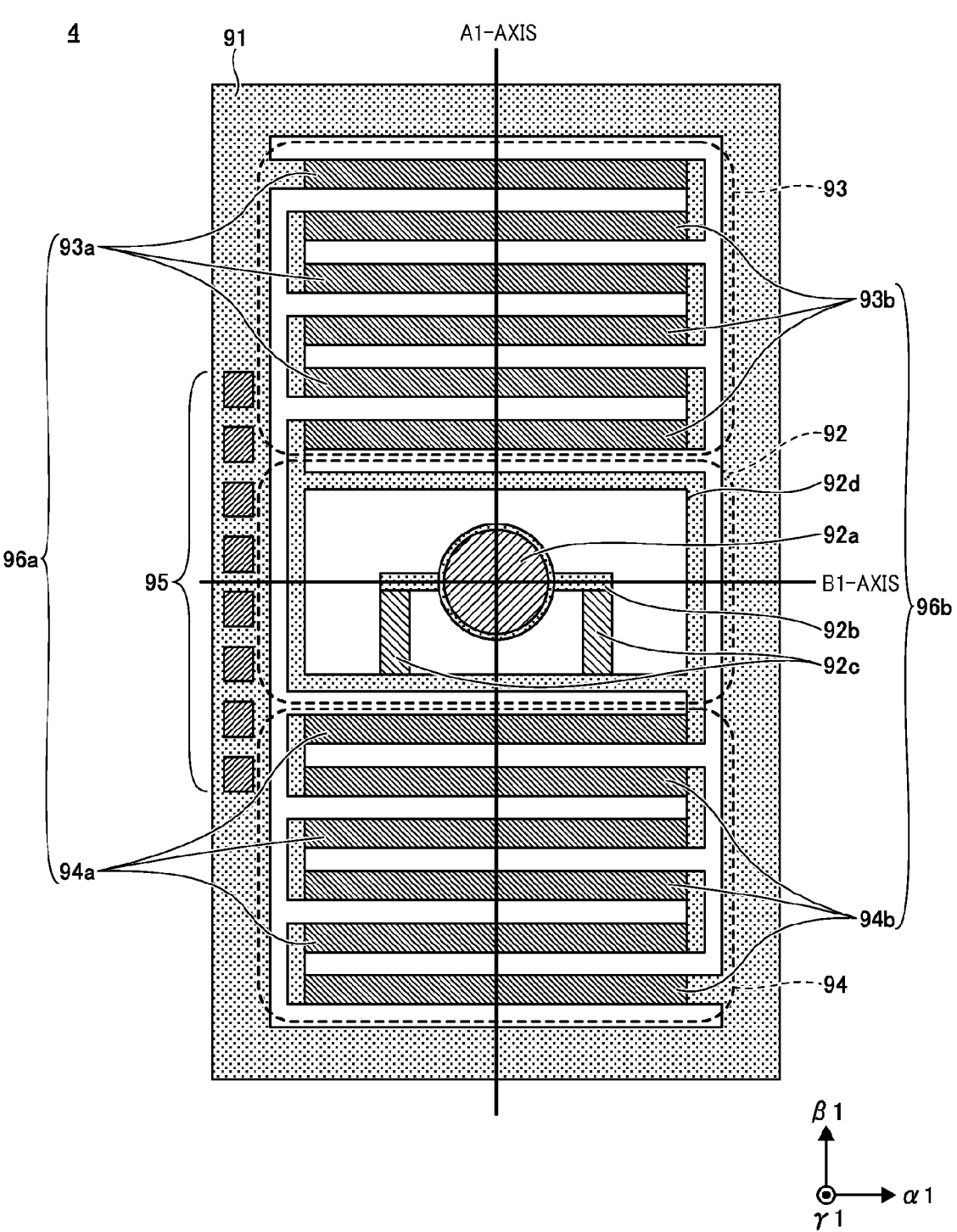
FIG. 2 is an illustration of a configuration of a light scanning mirror according to the first embodiment.

A configuration of the scanning mirror 4 is described with reference to FIG. 2. In FIG. 2, a configuration of the scanning mirror 4 is illustrated as an example. As illustrated in FIG. 2, the scanning mirror 4 includes a support substrate 91, a movable portion 92, a meandering beam portion 93, a meandering beam portion 94, and an electrode connecting portion 95.

The scanning mirror 4 drives the meandering beam portions 93 and 94 in response to a scanning drive signal $S_S$ applied through the electrode connecting portions 95 and oscillates the movable portion 92 supported by the meandering beam portions 93 and 94 around the A1-axis. Further, the scanning mirror 4 drives the torsion bar 92b included in the movable portion 92 and oscillates the reflection mirror 92a supported by the torsion bar 92b around the B1-axis.

The scanning mirror 4 continuously deflects the image laser beam $L_i$ incident on the reflection mirror 92a in two axes substantially orthogonal to each other by deflecting the image laser beam $L_i$ in a direction along the α1-axis by oscillating the movable portion 92 around the A1 axis and scanning the image laser beam $L_i$ in a direction along the β1-axis by oscillating the reflection mirror 92a around the B1-axis.

The meandering beam portion 93 has multiple folded portions and is formed in a meandering manner. One end of the meandering beam portion 93 is connected to the support substrate 91 and the other end the meandering beam portion is connected to the movable portion 92. The meandering beam portion 93 includes a beam portion 93a including three beams and a beam portion 93b including three beams. The beams of the beam portion 93a and the beams of the beam portion 93b are alternately formed. Each beam included in the beam portion 93a and the beam portion 93b individually includes a piezoelectric member.

Likewise, the meandering beam portion 94 is formed in a meandering manner to have multiple folding portions, and has one end connected to the support substrate 91 and the other end connected to the movable portion 92. The meandering beam portion 94 includes a beam portion 94a including three beams and a beam portion 94b including three beams. The beams of the beam portion 94a and the beams of the beam portion 94b are alternately formed. Each beam included in the beam portion 94a and the beam portion 94b individually includes a piezoelectric member. The number of beams in the beam portions 93a and 93b is not limited to three, and any number of beams may be provided.

The piezoelectric member included in the beam portions 93a, 93b, 94a, and 94b is formed as a piezoelectric layer in a part of a layer of each beam formed in, for example, a multilayer structure. Hereinafter, the beam portion 93a and the piezoelectric member included in the 94a are collectively referred to as a piezoelectric member 96a, and the beam portion 93b and the piezoelectric member included in the 94b are collectively referred to as a piezoelectric member 96b.

When voltage signals having opposite phases are applied to the piezoelectric member 96a and the piezoelectric member 96b to warp each of the meandering beam portions 93 and 94, adjacent beam portions are bent in different directions (i.e., bending). This bending is accumulated, and a driving force for oscillating the reflection mirror 92a back and forth around A1-axis in FIG. 2 is generated.

The movable portion 92 is formed so as to be sandwiched between the meandering beam portions 93 and 94 in the β1-axis direction. The movable portion 92 includes the reflection mirror 92a, a torsion bar 92b, a piezoelectric member 92c, and a support 92d.

The reflection mirror 92a includes, for example, a base member and a metal thin film provided by vapor deposition on the base member. The metal thin film includes, for example, aluminum (Al), gold (Au), or silver (Ag). One end of the torsion bar 92b is connected to the reflection mirror 92a and extends along $\pm\alpha 1$-axis to support the reflection mirror 92a so that the reflection mirror 92a oscillates.

In the piezoelectric member 92c, one end of the piezoelectric member 92c is connected to the torsion bar 92b, and the other end of the piezoelectric member 92c is connected to the support 92d. When a voltage is applied to the piezoelectric member 92c, the piezoelectric member 92c is bent and deformed to cause torsion of the torsion bar 92b. The torsion of the torsion bar 92b serves as a driving force, and the reflection mirror 92a oscillates around the B1-axis.

The image laser beam $L_i$ incident on the reflection mirror 92a scans along the $\alpha 1$-axis by the oscillation of the reflection mirror 92a around the A1-axis accompanying the oscillation of the movable portion 92. The image laser beam $L_i$ incident on the reflection mirror 92a scans along the $\beta 1$-axis by the oscillation of the reflection mirror 92a around B1-axis.

The support 92d is formed so as to surround the reflection mirror 92a, the torsion bar 92b, and the piezoelectric member 92c. The support 92d is connected to the piezoelectric member 92c and supports the piezoelectric member 92c. The support 92d indirectly supports the torsion bar 92b connected to the piezoelectric member 92c, and the reflection mirror 92a.

The support substrate 91 is formed so as to surround the movable portion 92, the meandering beam portion 93, and the meandering beam portion 94. The support substrate 91 is connected to and supports each of the meandering beam portions 93 and 94. The support substrate 91 also indirectly supports the movable portion 92 connected to the meandering beam portion 93 and the meandering beam portion 94.

The scanning mirror 4 is formed by, for example, the micromachining technique. For example, silicon or glass is used for micromachining. Using the micromachining technique, a micro-reflection mirror is formed on a substrate with high accuracy to be integral with a driving part such as a meandering beam portion.

Specifically, a single silicon on insulator (SOI) substrate is formed by etching. A reflection mirror, a meandering beam portion, a piezoelectric member, an electrode connection part are integrally formed on the SOI substrate, and the scanning mirror 4 is formed as a MEMS mirror. The reflective mirror may be formed after or during the formation of the SOI substrate.

The SOI substrate is a substrate in which a silicon oxide layer is provided on a silicon support layer made of single crystal silicon (Si), and a silicon active layer made of single crystal silicon is further provided on the silicon oxide layer. Since the silicon active layer has a smaller thickness along the $\gamma 1$-axis, which is substantially orthogonal to both the $\alpha 1$-axis and the $\beta 1$-axis, than the thickness along the $\alpha 1$-axis and the $\beta 1$-axis, a member including the silicon active layer serves as an elastic portion having elasticity.

The SOI substrate is not limited to being planar, and may have, for example, a curvature. As long as the substrate can be integrally fabricated by etching and can partly add elasticity, a member used for forming the MEMS mirror is not limited to the SOI substrate.

Configuration Example of Deflection Mirror 5

Figure 3:
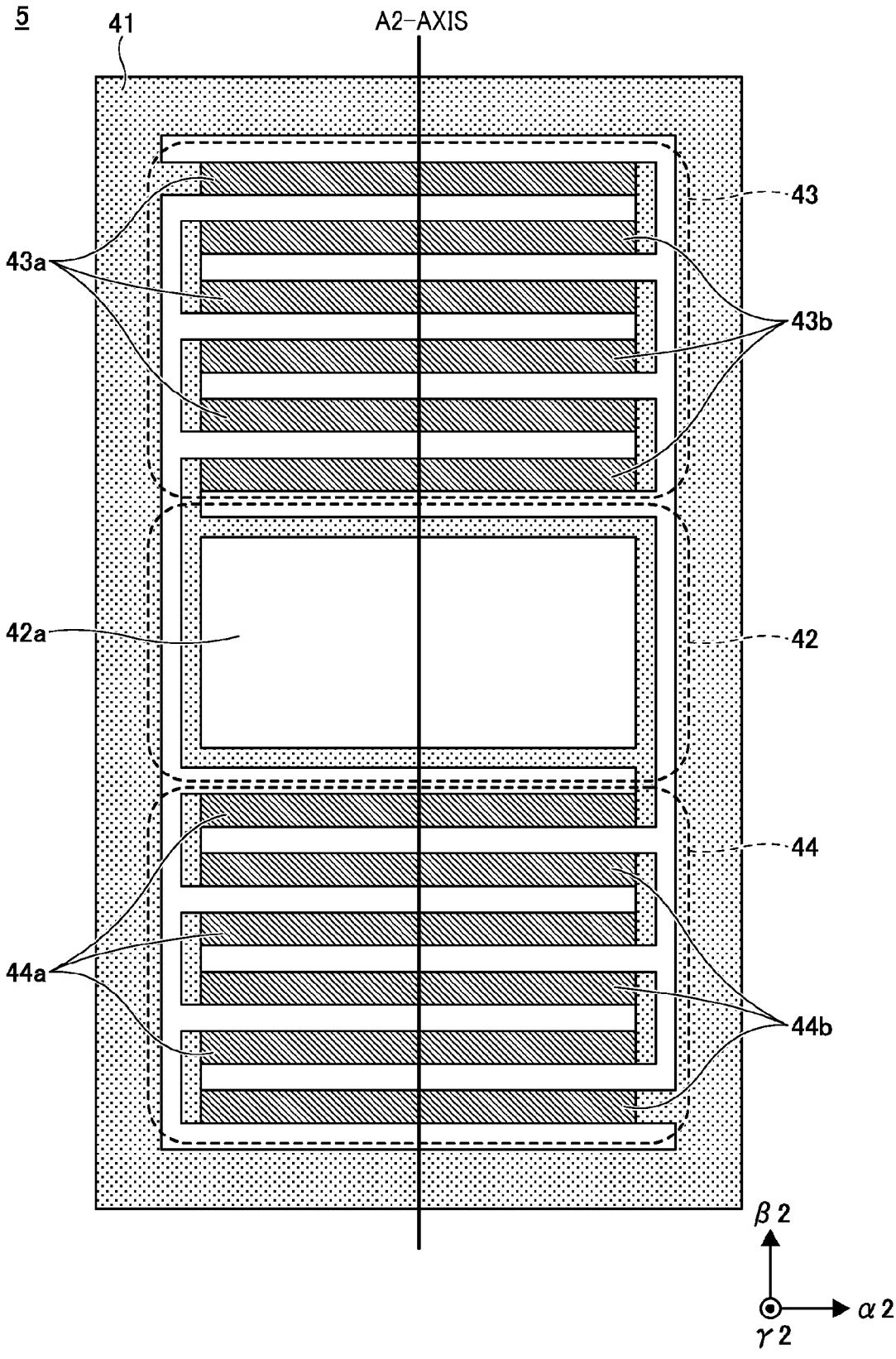
FIG. 3 is an illustration of a configuration of a light deflection mirror according to the first embodiment.

A configuration of the deflection mirror 5 is described with reference to FIG. 3. FIG. 3 is an illustration of a configuration of the deflection mirror 5 as an example. As illustrated in FIG. 3, the deflection mirror 5 includes a support substrate 41, a movable portion 42, a meandering beam portion 43, and a meandering beam portion 44.

The deflection mirror 5 drives the meandering beam portions 43 and 44 in response to deflection drive signals $S_T$ applied through the electrode connecting portions, thereby tilting the movable portion 42 supported by the meandering beam portions 43 and 44 around the A2-axis. The deflection mirror 5 deflects the image laser beam $L_i$ incident on the reflection mirror 42a included in the movable portion 42 in a direction along the $\alpha 2$-axis by tilting the movable portion 42 around the A2-axis.

The meandering beam portion 43 has a multiple folded portions and is formed in a meandering manner, and one end of the meandering beam portion 43 is connected to the support substrate 41 and the other end of the meandering beam portion 43 is connected to the movable portion 42. The meandering beam portion 43 includes a beam portion 43a including three beams and a beam portion 43b including three beams. The beams of the beam portion 43a and the beams of the beam portion 43b are alternately formed. Each beam included in the beam portion 43a and the beam portion 43b individually includes a piezoelectric member.

The meandering beam portion 44 is formed in a meandering manner to have multiple folding portions, and has one end connected to the support substrate 41 and the other end connected to the movable portion 42. The meandering beam portion 44 includes a beam portion 44a including three beams and a beam portion 44b including three beams. The beams of the beam portion 43a and the beams of the beam portion 43b are alternately formed. Each beam included in the beam portion 43a and the beam portion 43b individually includes a piezoelectric member.

The number of beams in each of the beam portions 43a and 43b is not limited to 3, and may be desirably determined. The piezoelectric members included in the beam portions 43a, 43b, 44a, and 44b are formed as a piezoelectric layer in a part of a layer of each beam formed in, for example, a multilayer structure. Hereinafter, the piezoelectric members included in the beam portions 43a and 44a are collectively referred to as piezoelectric members 45a, and the piezoelectric members included in the beam portions 43b and 44b are collectively referred to as piezoelectric members 45b.

When voltages having opposite phases are applied to the piezoelectric member 45a and the piezoelectric member 45b to warp the meandering beam portions 44, the adjacent beam portions are bent in different directions (i.e., bending). This bending is accumulated, and a driving force to tilt the reflection mirror 42a around the A2 axis is generated.

The movable portion 42 is formed so as to be sandwiched between the meandering beam portions 43 and 44 along the $\beta 2$-axis. The movable portion 42 is provided with a reflection mirror 42a at the center part, and the reflection mirror 42a is tilted around the A2-axis by the driving force of the meandering beam portions 43 and 44. The image laser beam $L_i$ that enters and is reflected by the reflection mirror 42a is deflected along the $\alpha 2$-axis by the tile.

The support substrate 41 is formed so as to surround the movable portion 42, the meandering beam portions 43, and the meandering beam portions 44. The support substrate 41 is connected to the meandering beam portion 43 and the meandering beam portion 44 to support the meandering beam portion 43 and the meandering beam portion 44. The support substrate 41 also indirectly supports the movable portion 42 connected to the meandering beam portion 43 and the meandering beam portion 44.

Similar to the scanning mirror 4, the deflection mirror 5 is formed by, for example, a micromachining technique. For example, silicon or glass is used for micromachining. Thus a repeated description thereof will be omitted.

Figure 4:
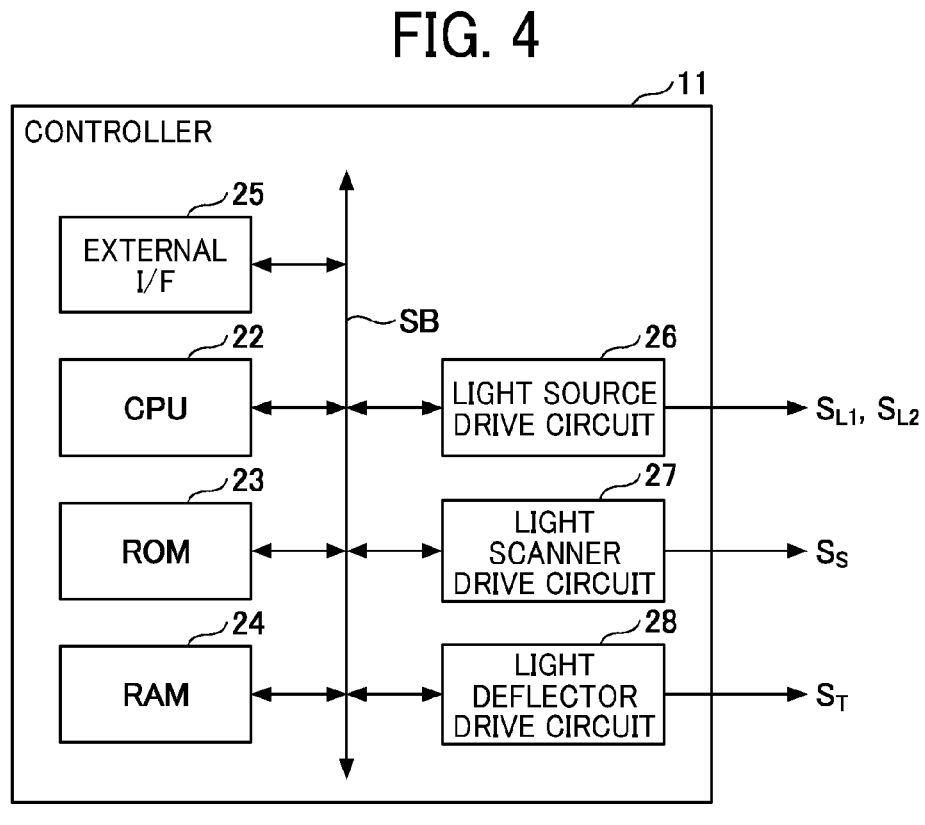
FIG. 4 is a block diagram of a hardware configuration of a controller according to the first embodiment.

Example of Hardware Configuration of Controller 11 A configuration of the controller 11 as a hardware is described with reference to FIG. 4. FIG. 4 is a block diagram of a hardware configuration of the controller 11 as an example.

As illustrated in FIG. 4, the controller 11 includes a central processing unit 22 (CPU), a read only memory 12 (ROM), a random access memory 24 (RAM), an external interface 25 (I/F), a light source drive circuit 26, a light scanner drive circuit 27, and a light deflector drive circuit 28. These components are electrically connected to each other via a system bus SB.

The CPU 22 is an arithmetic device that reads programs and data from a storage device such as a ROM 23 in the RAM 24, executes processing, and implements the overall control and functions of the controller 11. The RAM 24 is a volatile storage device that temporarily stores programs and date.

The ROM 23 is a non-volatile storage device that can hold programs and date even when the power is turned off, and stores processing programs and data to be executed by the CPU 22 to control each function of the retinal projection display 100.

The external I/F 25 is an interface with an external device or a network. Examples of the external device include a host device such as a personal computer (PC), and a storage device such as a USB memory, an SD card, a CD, a DVD, an HDD, or an SSD. Examples of the network include a controller area network (CAN) of an automobile, a local area network (LAN), and the Internet. The external I/F 25 may enable connection or communication with the external device, and the external I/F 25 may be prepared for each external device.

The light source drive circuit 26 is an electric circuit that is electrically connected to the image laser light source 1 and the detection laser light source 7, and drives them by applying current or voltage. The image laser light source 1 turns on and off the emission of the image laser beam $L_i$ or changes the light intensity of the image laser beam $L_i$ in accordance with the formation drive signals $S_{L1}$ output from the light source drive circuit 26. The detection laser light source 7 turns on and off the emission of the detection laser beam $L_S$ or changes the light intensity of the detection laser beam $L_S$ in accordance with the formation drive signals $S_{L1}$ output from the light source drive circuit 26.

The light scanner drive circuit 27 is an electric circuit that is electrically connected to the scanning mirror 4 and drives the scanning mirror 4 by applying a voltage to the scanning mirror 4. The scanning mirror 4 is driven in accordance with a scanning drive signal $S_S$ output from a light scanner drive circuit 27.

The light deflector drive circuit 28 is an electric circuit that is electrically connected to the deflection mirror 5 and drives the deflection mirror 5 by applying a voltage to the deflection mirror 5. The deflection mirror 5 is driven in accordance with a deflection drive signal $S_T$ output from a light deflector drive circuit 28.

The controller 11 obtains the image date Dat from an external device or a network via the external I/F 25. However, the controller 11 is not limited to obtaining the image date Dat from an external device or a network, and may obtain the image date Dat stored in advance in a ROM 23 in the controller 11 or may obtain the image date Dat from a storage device such as a secure digital (SD) card provided in the controller 11.

The controller 11 achieves a functional configuration described below by an instruction of the CPU 22 and the hardware configuration illustrated in FIG. 4.
Example of Function Configuration of the Controller 11

Figure 5:
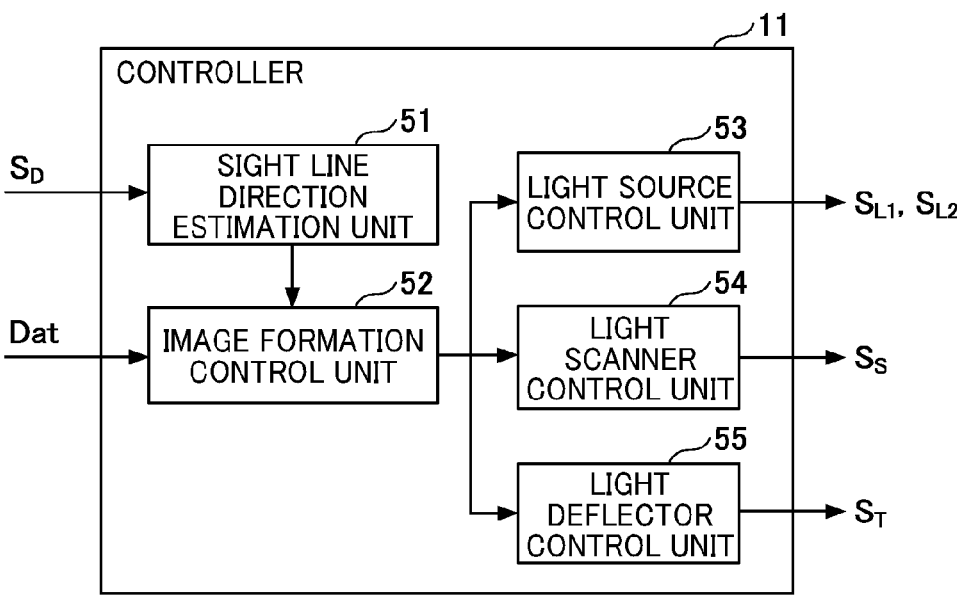
FIG. 5 is a block diagram of a functional configuration of a controller according to the first embodiment.

A function configuration of the controller 11 is described with reference to FIG. 5. FIG. 5 is a block diagram of a functional configuration of the controller 11 as an example.

As illustrated in FIG. 5, the controller 11 includes a sight-line-direction estimation unit 51, an image formation control unit 52, a light source control unit 53, a light scanner control unit 54, and a light deflector control unit 55. The functions of control unit described above are implemented by the CPU 22 in FIG. 4 executing a predetermined program stored in, for example, a ROM, and by the light source drive circuit 26, the light scanner drive circuit 27, the light deflector drive circuit 28.

The sight-line-direction estimation unit 51 estimates in which viewing zone the sight line is present among the predetermined nine viewing zones (i.e., x=9) based on the light emission timing of each light emitting member included in the detection laser light source 7 and the detection signal $S_D$ output by the light detection element 8.

The image formation control unit 52 generates the formation drive signal $S_{L1}$, the scan drive signals $S_S$, and the deflection drive signals $S_T$ based on the information indicating the field of view visually recognized by the user, which is estimated by the sight-line-direction estimation unit 51 and the image data. The image formation control unit 52 controls: the light source control unit 53 to output the formation drive signal $S_{L1}$ to the image laser light source 1; the light scanner control unit 54 to output scanning drive signals $S_S$ to the scanning mirror 4; and the light deflector control unit 55 to output deflection drive signals $S_T$ to the deflection mirror 5.

When an image visually recognized by the user has, for example, distortion, the controller 11 may correct the distortion. The image formation control unit 52 is an example of a projection information output means that outputs projection information to the light source in order to output the projection information to the image laser light source 1 via the light source control unit 53.
Configuration of Projection Optical Element 6

Figure 6B:
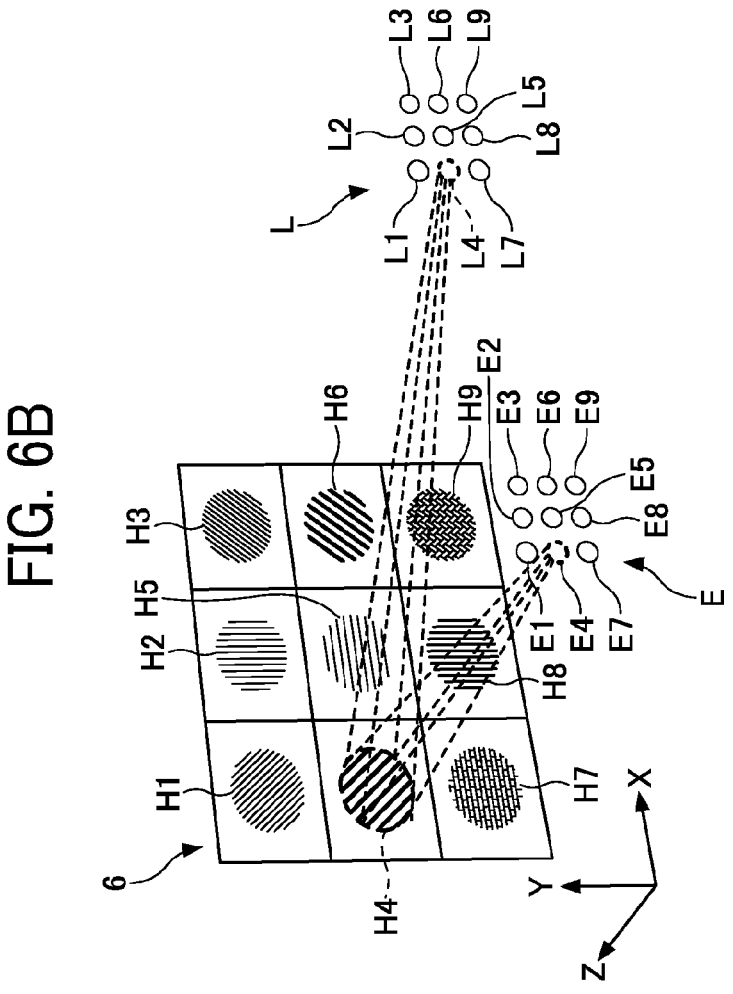
FIG. 6B is a perspective view of the projection optical element according to the first embodiment in FIG. 1.
Figure 6A:
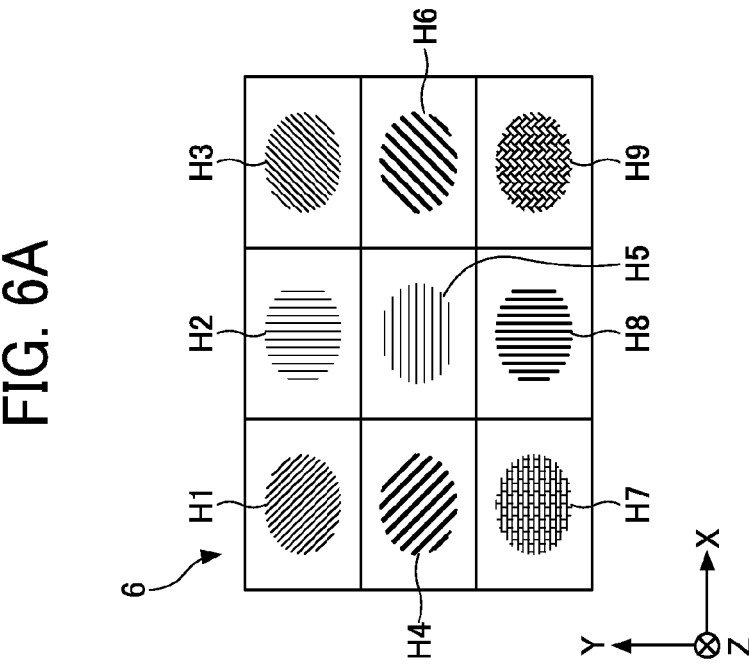
FIG. 6A is a plan view of a projection optical element according to the first embodiment in FIG. 1.

The configuration of the projection optical element 6 is described with reference to FIGS. 6A and 6B. FIGS. 6A and 6B are illustrations of the configuration of the projection optical element 6. FIG. 6A is a plan view, and FIG. 6B is a perspective view.

As illustrated in FIG. 6A, the projection optical element 6 has nine divided hologram regions H1 to H9 (i.e., x=9). In other words, nine divided hologram regions are multiple divided projection regions. Each of the hologram regions H1 to H9 is an example of a projectable region that reflects incident light under predetermined incident conditions to a predetermined position and thus collects the reflected light at the predetermined position. The predetermined incident conditions include the position and direction of the incident light defined for each of the hologram regions H1 to H9.

As illustrated in FIG. 6B, each of the hologram regions H1 to H9 reflects light emitted from the emission regions L1 to L9 corresponding to the hologram regions H1 to H9, respectively and focuses the light at different nine positions (i.e., x=9) in the vicinity of the pupil 31, the nine positions (viewing zones E1 to E9) corresponding to the hologram regions (and also the emission regions L1 to L9), respectively. As a result, the nine viewing zones (i.e., x=9) E1 to E9 are provided.

The emission regions L1 to L9 are, for example, nine regions at different positions on the horizontal plane of the scanning mirror 4. The viewing zones E1 to E9 are, for example, nine regions located at different positions on the pupil 31 of the eyeball 30. The emission regions L1 to L9 are collectively referred to as an emission region L when they are not distinguished from each other, and the viewing zones E1 to E9 are collectively referred to as a viewing zone E when they are not distinguished from each other.

FIG. 6B illustrates a state in which the light emitted from the emission region L4 positioned on the left side of the middle stage of the emission regions L arranged in a matrix of three rows and three columns is reflected by the hologram region H4 of the projection optical element 6 and collected in the viewing zone E4.

The projection optical element 6 reflects light having a wavelength band much narrower than the wavelength band of visible light and transmits light having other wavelengths. Most of the light propagating to the eyeball 30 of the user from the real space passes through the projection optical element 6 and enters the eyeball 30.

In the case where the projection optical element 6 reflects and collects light having multiple wavelengths, the projection optical element 6 may be formed of a single layer of a wavelength-multiplexed holographic film. Alternatively, the projection optical element 6 may be formed by laminating multiple holographic film layers whose wavelength bands include multiple wavelengths to be reflected and collected.

The projection optical element 6 is formed to collect the image laser beam $L_i$ on nine different positions. For example, the hologram regions H1 to H9 may be formed on one layer of a holographic film by one-shot exposure, or nine holographic films corresponding to the hologram regions H1 to H9 may be separately formed and bonded to glass or a transparent film with an adhesive to manufacture the projection optical element 6.

The patterns of the hologram regions H1 to H9 illustrated in FIG. 6 are simplified and different from actual patterns. Operation Example of Scanning Mirror 4

The operation of the scanning mirror 4 is described with reference to FIGS. 7A to 9B.

Figures 7A, 7B:
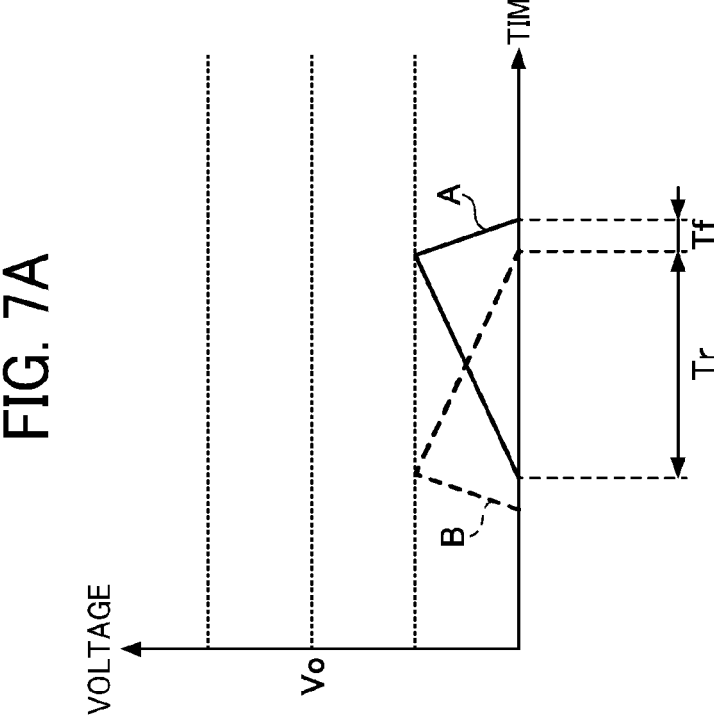
FIG. 7A is a timing chart of a first example of a drive waveform of the light scanning mirror according to the first embodiment.
FIG. 7B is an illustration of a first example of scanning light of the light scanning mirror according to the first embodiment.

An operation in a case where a reference voltage of a drive voltage A applied to the piezoelectric member 95a of the scanning mirror 4 is equal to a reference voltage of a drive voltage B applied to the piezoelectric member 95b are described with reference to FIGS. 7A and 7B. FIG. 7A is a timing chart of a waveform of a drive voltage. FIG. 7B is an illustration of an operation of the scanning mirror 4 when the drive voltage of FIG. 7A is applied.

When the scanning mirror 4 scans in the main scanning direction (i.e., the X-direction) with the image laser beam Li, a drive voltage having a sine wave is applied to the piezoelectric member 92c as the scanning drive signals $S_S$ from the controller 11. As a result, the scanning mirror 4 causes the movable portion 92 to oscillate back and forth about the B-axis in the cycle of the drive voltage. For example, when a frequency of the drive voltage is 20 kHz, which is substantially equal to the resonance frequency of the torsion bars 92b, the movable portion 92 can resonantly oscillate at 20 kHz using mechanical resonance caused by twisting of the torsion bars 92b.

The waveform of the drive voltage is not limited to a sine wave, and may be, for example, a sawtooth wave. The sawtooth wave can be generated by superimposing sine waves. A waveform in which an apex of the sawtooth wave is rounded, or a waveform in which a linear region of the sawtooth wave is curved may be used.

When the scanning mirror 4 scans in the sub-scanning direction (i.e., the Y-direction) with the image laser beam Li, the waveform of the drive voltage A applied to the piezoelectric member 95a as the scanning drive signal $S_S$ from the controller 11 is, for example, a sawtooth wave. The frequency of the drive voltage A is, for example, 60 Hz.

The waveform of the drive voltage A has a preset ratio of Tr:Tf=9:1 where Tr is a time width of a rising duration in which the voltage value increases from a minimum value to a maximum value and Tf is a time width of a falling duration in which the voltage value decreases from the maximum value to a next minimum value. The minimum value of the drive voltage A is a reference voltage Va (Va≥0).

The waveform of the drive voltage B applied to the piezoelectric member 95b is a sawtooth wave, similarly to the drive voltage A. The frequency of the drive voltage B is, for example, 60 Hz. Herein, the minimum value of the drive voltage B is set as a reference voltage Vb (Vb≥0). A ration of Tr to Tf of the waveform of the drive voltage B is set in advance (e.g., Tf:Tr=9:1).

As illustrated in FIG. 7A, when the reference voltages of the drive voltage A and the drive voltage B are equal to each other (i.e., Va=Vb), and the maximum values are equal to each other, a standard vertical drive state for scanning in the sub-scanning direction is set. As described above, an image is formed as illustrated in FIG. 7B by scanning the main scanning direction and the sub-scanning direction with the image laser beam $L_i$ by the scanning mirror 4 and by synchronizing with the image laser beam Li, which turns on and off, based on the image formation drive signal $S_{L1}$.

In FIG. 7B, the scanning mirror 4 scans a surface 73 to be scanned with the image laser beam $L_i$ to form an image on the surface 73. The scanned surface 73 is an example of multiple projectable areas. The surface 73 includes a projection region 74 and a non-projection region 75. The projection region 74 is an area on which an image is projected, and the non-projection region 75 is an area on which no image is projected. In the retinal projection display 100, the surface 73 corresponds to a surface included in the projection optical element 6.

The controller 11 forms the projection region 74 and the non-projection region 75 on surface 73 corresponding to the projectable region by controlling the deflection direction of the scanning mirror 4.

Assuming that a region on which an image is projected by the drive voltage in the standard vertical drive state is a projection region 74 in the standard vertical drive state, the region on which an image is projected is vertically displaced along the Y-direction with respect to the projection region 74 by providing a difference between the reference voltages of the drive voltage A and the drive voltage B (Va>Vb or Vb>Va) while maintaining the waveforms of the drive voltage A and the drive voltage B.

A drive voltage pattern in the standard vertical drive state is not limited to the pattern illustrated in FIG. 7A as long as the reference voltages of the drive voltage A and the drive voltage B are equal to each other (i.e., Va=Vb) and the maximum values are equal to each other. For example, even in a case where an offset voltage is Vo, in which Vo is larger than zero (i.e., Vo>0) and equal to Va and Vb (i.e., Va=Vb=Vo), and a drive voltage pattern in which the maximum values of the drive voltage A and the drive voltage B are equal to each other is employed, an image is projected onto the projection region 74 as illustrated in FIG. 7B.

Figure 8A:
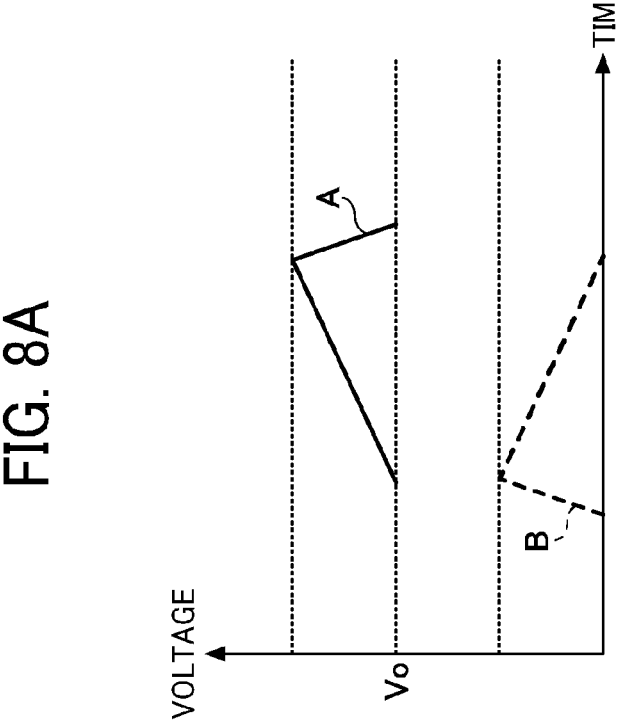
FIG. 8A is a timing chart of a second example of a drive waveform of the light scanning mirror according to the first embodiment.
Figure 8B:
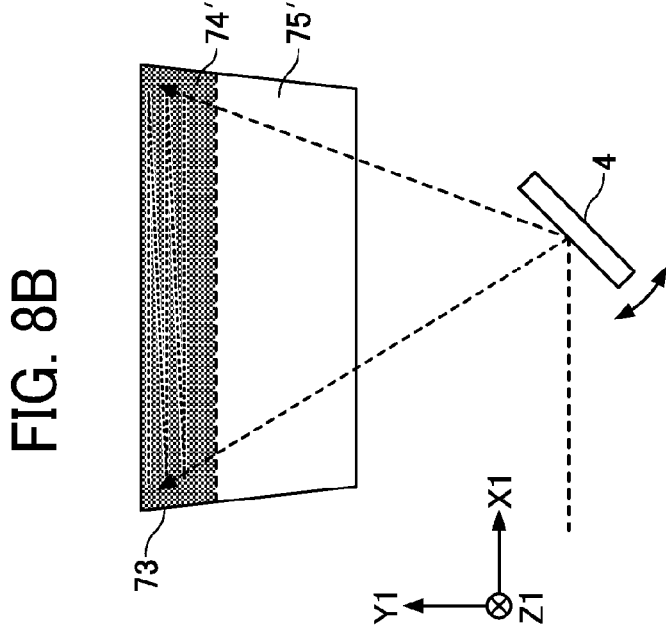
FIG. 8B is an illustration of a second example of scanning light of the light scanning mirror according to the first embodiment.

An operation in case where the reference voltage of the drive voltage A applied to the piezoelectric member 95b of the scanning mirror 4 is larger than the drive voltage B applied to the piezoelectric member 95a (i.e., Va>Vb) are described with reference to FIGS. 8A and 8B. FIG. 8A is an illustration of a waveform of a drive voltage, and FIG. 8B is an illustration of an operation of the scanning mirror 4 at the drive voltage of FIG. 8A.

As illustrated in FIG. 8A, an offset voltage Vo is applied to the reference voltage Va of the drive voltage A applied to the piezoelectric member 95a of the scanning mirror 4 while maintaining the waveform of the drive voltage of FIG. 7A in the standard vertical driving state, and a condition in which Va is equal to Vo, and Vo is larger than Vb is set (i.e., Va=Vo>Vb). In this case, as illustrated in FIG. 8B, an image can be projected onto a projection region 74' displaced in the +Y-direction with respect to the projection region 74 in the standard vertical driving state (see FIG. 7B). The non-projection region 75' is an area in which no image is projected on the surface 73 in this case.

Figures 9A, 9B:
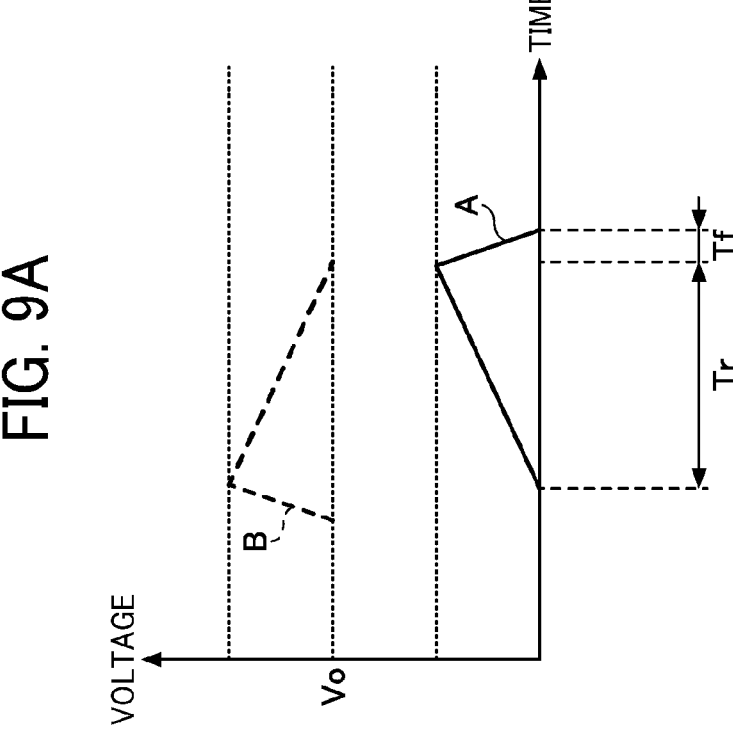
FIG. 9A is a timing chart of a drive waveform of the light scanning mirror as a third example according to the first embodiment.
FIG. 9B is an illustration of scanning light of the light scanning mirror as the third example according to the first embodiment.

FIGS. 9A and 9B are illustrations of an example of operation in a case where the reference voltage of the drive voltage B applied to the piezoelectric member 95a of the scanning mirror 4 is larger than the drive voltage A applied to the piezoelectric member 95b (i.e., Vb>Va) are described with reference to FIGS. 9A and 9B. FIG. 9A is an illustration of a waveform of a drive voltage, and FIG. 9B is an illustration of an operation of the scanning mirror 4 at the drive voltage of FIG. 9A.

As illustrated in FIG. 9A, an offset voltage Vo is applied to the reference voltage Vb of the drive voltage B applied to the piezoelectric member 95b of the scanning mirror 4 while maintaining the waveform of the drive voltage of FIG. 7B in the standard vertical driving state, and a condition in which Vb is equal to Vo, and Vo is larger than Va is set (i.e., Vb=Vo>Va). In this case, as illustrated in FIG. 9B, an image is projected onto a projection region 74" displaced in the −Y-direction with respect to the projection region 74 in the standard vertical driving state (see FIG. 7B). The non-projection region 75" is an area where no image is projected on the surface 73 in this case.

As illustrated in FIGS. 7A to 9B, the position of the projection region of the image is changed in three stages along the Y-direction by controlling the drive voltage for changing the combination of the drive voltage A and the drive voltage B applied to the scanning mirror 4. In other words, the scanning mirror 4 changes the position of the projection region of the image in three stages along the Y-direction by deflecting the image laser beam $L_i$.

Operation Example of Deflection Mirror 5

The operation of the deflection mirror 5 is described with reference to FIGS. 10A to 10C as an example. FIG. 10A is an illustration of a waveform of a drive voltage and an operation of the deflection mirror 5 when a drive voltage C is equal to a drive voltage D. FIG. 10B is an illustration of the waveform of the drive voltage and the operation of the deflection mirror 5 when the drive voltage C is larger than the drive voltage D. FIG. 10C is an illustration of the waveform of the drive voltage and the operation of the deflection mirror 5 when the drive voltage D is larger than the drive voltage C.

The controller 11 applies a drive voltage C as a direct current voltage to the piezoelectric member 43A (44A), and applies a drive voltage D as a direct current voltage to the piezoelectric member 43B (44B) so as to be opposite in phase to the drive voltage C.

As illustrated in FIG. 10A, when the drive voltage C and the drive voltage D to be applied are equal to each other, the movable portion 42 of the deflection mirror 5 stops while maintaining a tilt at an angle θ (θ≥0) with respect to the X-axis. Herein, a driving state in which the applied drive voltage C and the drive voltage D are equal to each other is referred to as a standard horizontal driving state, and a region where the image laser beam $L_i$ that enters in the standard horizontal driving state is reflected and an image is projected on the surface 83 to be scanned is referred to as a projection region 84. The non-projection region 85 is an area where an image is not projected on the surface 83.

Herein, the surface 83 is an example of multiple projectable areas. The controller 11 forms a projection region 84 and a non-projection region 85 on the surface 83 corresponding to the projectable region by controlling the deflection mirror 5.

As illustrated in FIG. 10B, when the drive voltage C is larger than the drive voltage D, the movable portion 42 of the deflection mirror 5 stops while maintaining a tilt at an angle of θL (θL>θ) with respect to the X-axis. Thus, the reflection direction of the image laser beam $L_i$ to be entered the deflection mirror 5 is changed to the −X direction with respect to the projection region 84. The projection region 84' is an area on which an image is projected in the surface 83, and the non-projection region 85' is an area on which an image is not projected in the scanned surface 83.

As illustrated in FIG. 10C, when the drive voltage D is larger than the drive voltage C, the movable portion 42 of the deflection mirror 5 remains stationary while maintaining a tilt at an angle of θR (θR<θ) with respect to the X-axis. Thus, the reflection direction of the image laser beam $L_i$ to be entered the deflection mirror 5 is changed to the +X-direction with respect to the projection region 84. The projection region 84" is an area on which where an image is projected in the surface 83, and the non-projection region 85" is an area on which an image is not projected in the surface 83.

In such a manner, by changing the magnitude relation between the drive voltage C and the drive voltage D, the tilt of the movable portion 42 of the deflection mirror 5 changes in three stages, similarly to the scanning mirror 4. Thus, a position of the projection region of the image is changed in three stages along the X-direction by controlling the drive voltage applied to the deflection mirror 5. In other words, the deflection mirror 5 changes the position of the projection region of the image in three stages along the X-direction by deflecting the scanned image laser beam $L_i$.

Viewing Zone Switching Operation Example by Retinal Projection Display 100

Figure 11:
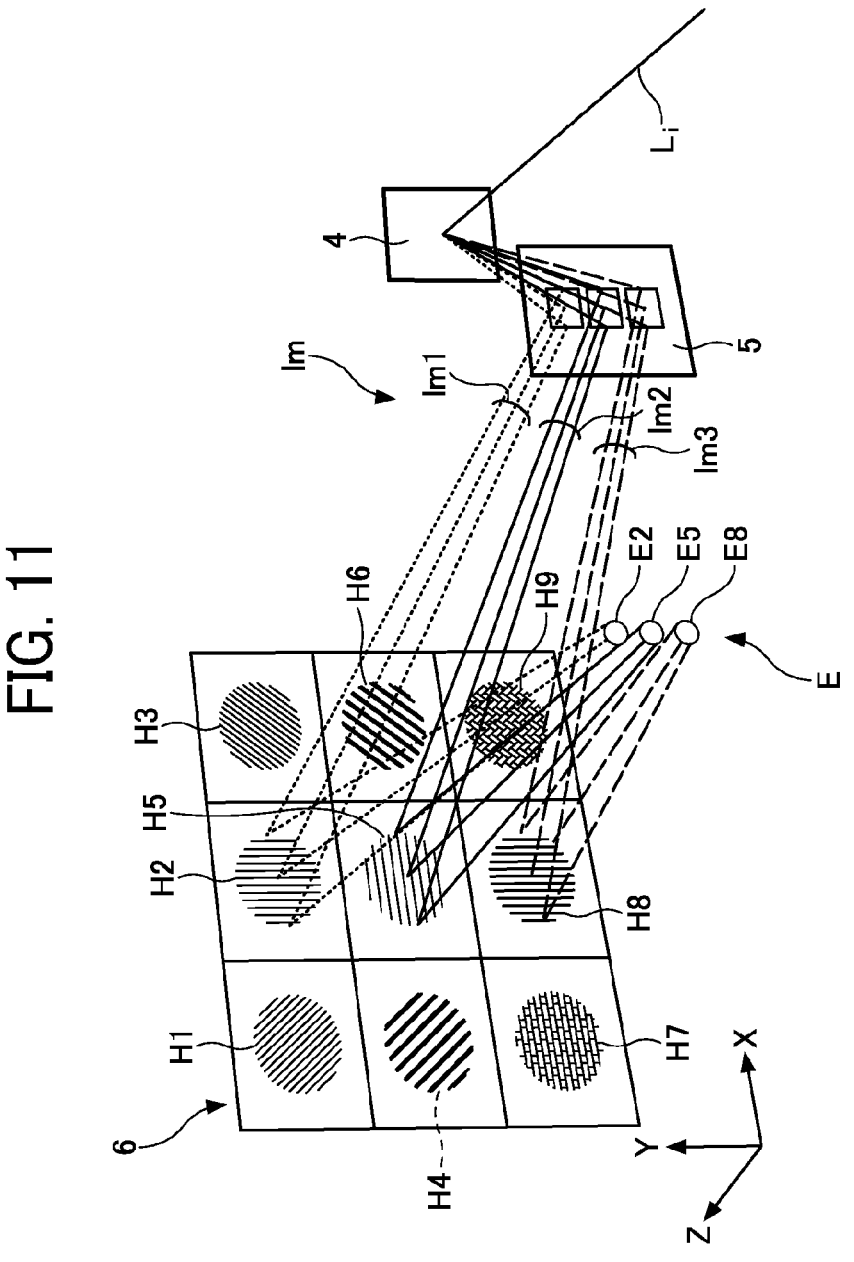
FIG. 11 is an illustration of a switching operation of a viewing zone in the Y-direction according to the first embodiment.

Switching Operation in the X-direction A switching operation of the viewing zone in the Y-direction in the retinal projection display 100 is described with reference to FIG. 11. FIG. 11 is an illustration of a operation of switching the viewing zone in the Y-direction performed by the retinal projection display 100.

As illustrated in FIG. 11, an image laser beam $L_i$ is continuously deflected by a scanning mirror 4 to form image light Im. The image light Im is deflected by the deflection mirror 5 to change a deflection direction of the image light Im in the Y-direction and generates the image light Im1, the image light Im2, and the image light Im3. The image light Im1, the image light Im2, and the image light Im3 are deflected by the deflection mirror 5 and projected onto the projection optical element 6. Herein, the image lights Im1 to Im3 are collectively referred to as the image light Im The image light Im2 is formed by the scanning mirror 4 in the standard vertical driving state illustrated in FIG. 7. The image light Im1 is formed by the scanning mirror 4 when a drive voltage satisfying a condition in which Va is larger than Vb (i.e., Va>Vb) illustrated in FIG. 8 is applied. The image light Im3 is formed by the scanning mirror 4 when a drive voltage satisfying a condition in which Vb is larger than Va (i.e., Vb>Va) illustrated in FIG. 9 is applied.

As illustrated in FIG. 11, the image light Im reflected by the deflection mirror 5 is projected onto three regions arranged in the Y-direction at the center of the projection optical element 6 in the standard horizontal driving state of the deflection mirror 5. Specifically, the image light Im1 is projected onto the hologram region H2, the image light Im2 is projected onto the hologram region H5, and the image light Im3 is projected onto the hologram region H8.

The hologram regions H1 to H9 in the projection optical element 6 reflect the image light Im projected on each region to a predetermined position and collect the image light at the predetermined position. The image light Im is configured to satisfy the incident conditions for the hologram regions H1 to H9, respectively. Specifically, the image light Im1 satisfies the incident condition of the hologram region H2, the image light Im2 satisfies the incident condition of the hologram region H5, and the image light Im3 satisfies the incident condition of the hologram region H8.

As a result, the image light Im1 is reflected by the hologram region H2 and collected on the viewing zone E2. The image light Im2 is reflected by the hologram region H5 and collected on the viewing zone E5. The image light Im3 is reflected by the hologram region H8 and collected on the viewing zone E8.

The retinal projection display 100 is formed such that the viewing zone E5 is included in the pupils 31 of a user when the user views frontward in a state where the user wears the retinal projection display 100. The user visually recognized an image within a finite field of view provided by the viewing zone E5.

The viewing zone E2 is located above as viewed from the user, and the viewing zone E8 is located below as viewed from the user. The retinal projection display 100 is formed such that when the user moves the sight line upward beyond the finite viewing angle of the viewing zone E5, the user is provided with a field of view by the viewing zone E2, and when the user moves the sight line downward beyond the finite viewing angle of the viewing zone E5, the user is provided with a field of view by the viewing zone E8.

Thus, even when the user moves the sight line upward or downward beyond the finite viewing angle provided with the viewing zone E5, the user can visually recognize the image. As a result, the viewing zone is enlarged. The retinal projection display 100 changes the viewing zone in three stages along the Y-direction and enlarges the viewing zone along the Y-direction by controlling the drive voltage of the scanning mirror 4.

Switching Operation in the X-Direction

Figure 12:
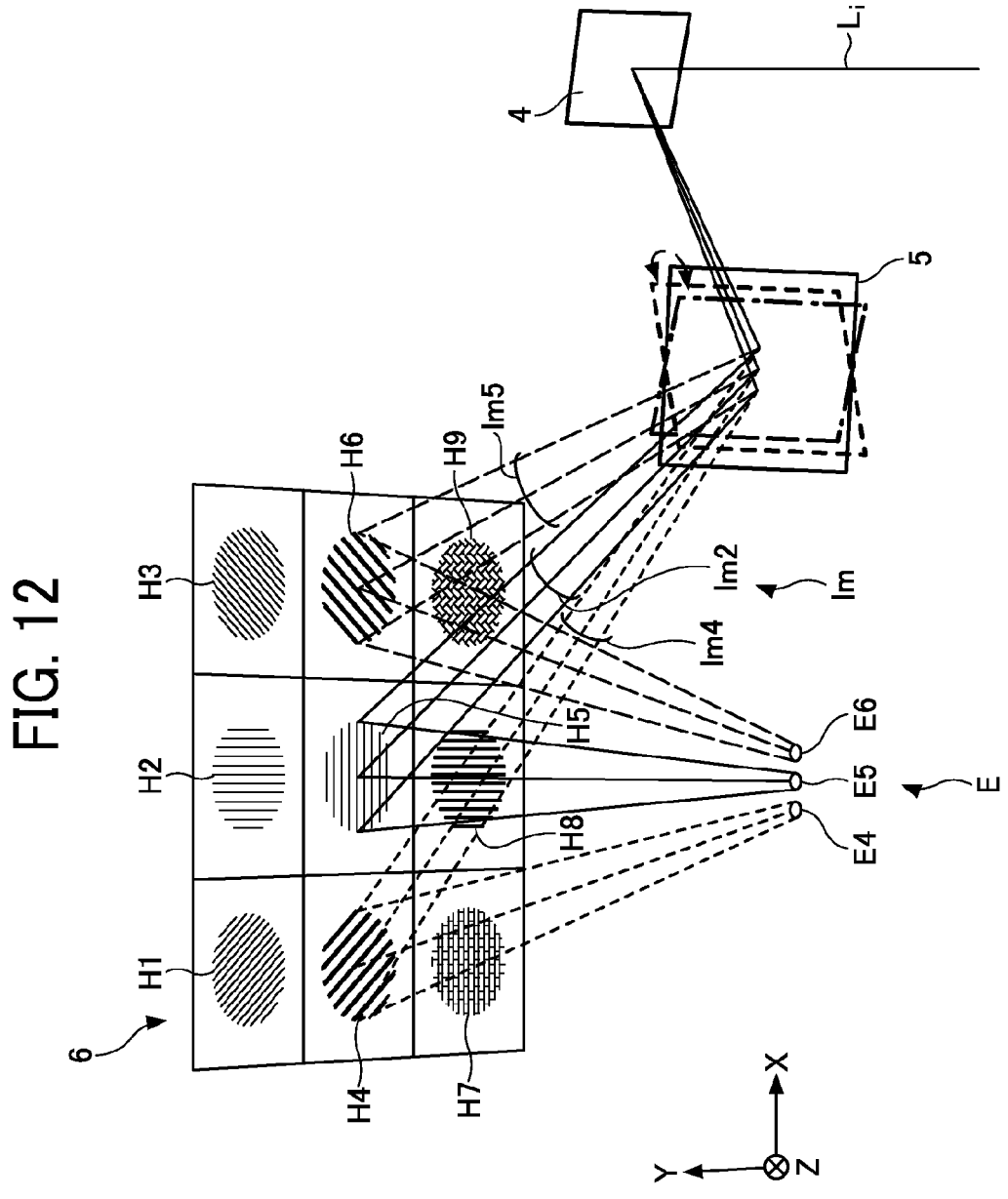
FIG. 12 is an illustration of a switching operation of a viewing zone in the X-direction according to the first embodiment.

A viewing zone of the X-direction in the retinal projection display 100 is described with reference to FIG. 12. FIG. 12 is an illustration of a viewing zone switching operation in the X-direction in the retinal projection display 100.

In FIG. 12, the scanning mirror 4 scans viewing zones with an image laser beam L_i in a standard vertical driving state to form image light Im. The image light Im is deflected in three different stages in the X-direction in accordance with the tilt of the deflection mirror 5, and is projected onto three regions arranged in the X-direction at the center of the projection optical element 6.

As illustrated in FIG. 10A, the image light Im2 is deflected at a tilt angle θ when the deflection mirror 5 is driven in a standard horizontal driving state. As illustrated in FIG. 10B, the image light Im4 is deflected at a tile angle θL in a case where a drive voltage in which the drive voltage C is larger than the drive voltage D (i.e., C>D) is applied. As illustrated in FIG. 10C, the image light Im5 is deflected at an tilt angle θR in a case where a drive voltage in which the drive voltage D is larger than the drive voltage C (i.e., D>C) is applied.

In accordance with the tilt of the deflection mirror 5, the image light Im4 is projected onto the hologram region H4, the image light Im2 is projected onto the hologram region H5, and the image light Im5 is projected onto the hologram region H6. The image light Im4 satisfies an incident condition of the hologram region H4, the image light Im2 satisfies an incident condition of the hologram region H5, and the image light Im5 satisfies an incident condition of the hologram region H6.

As a result, the image light Im4 is reflected by the hologram region H4 and collected on the viewing zone E4, the image light Im2 is reflected by the hologram region H5 and collected on the viewing zone E5, and the image light Im5 is reflected by the hologram region H6 and collected on the viewing zone E6.

The viewing zone E4 is located on the left side as viewed from the user, and the viewing zone E6 is located on the right side as viewed from the user. The retinal projection display 100 is formed such that when the user moves the sight line to the left beyond the finite viewing angle of the viewing zone E5, the user is provided with a field of view by the viewing zone E4, and when the user moves the sight line to the right beyond the finite viewing angle of the viewing zone E5, the user is provided with a field of view by the viewing zone E6.

Accordingly, even when the user moves the sight line to the left or right beyond the finite viewing angle provided by the viewing zone E5, the user can visually recognize the image. As a result, the viewing zone is enlarged. The retinal projection display 100 controls a voltage of the deflection mirror 5 to change the viewing zone in three stages and enlarges the viewing zone along the X-direction.

As described above, in the retinal projection display 100, the deflection direction of the image light Im projected onto the projection optical element 6 is changed in three stages in the Y-direction by controlling the drive voltage of the scanning mirror 4, and the deflection direction of the image light Im projected onto the projection optical element 6 is changed in three stages in the X-direction by controlling the drive voltage of the deflection mirror 5.

In other words, the deflection direction of the image light Im formed by the scanning mirror 4 is changed to nine directions (i.e., x=3×3=9) by a combination of the drive voltage control of the scanning mirror 4 and the deflection mirror 5.

Since the image light Im projected onto each of the hologram regions H1 to H9 satisfy the incidence condition of each region, the image light Im focuses onto nine viewing zones E1 to E9 (i.e., x=9) arranged in a 3×3 array illustrated in FIG. 6.

The user visually recognizes the image light Im wherever a user views in the field of views provided by the viewing zones E1 to E9 and selectively visually recognizes the field of view provided by any one of the viewing zones E1 to E9 by changing the direction of the sight line. Since the hologram regions H1 to H9 are divided and provided in the projection optical element 6, the light collecting characteristics of the hologram regions to the viewing zones E1 to E9 are optimized so as to be substantially equal to each other. As a result, a uniform image quality is provided in the field of view provided by any of the visual zones E1 to E9.

The finite viewing angle of the viewing zone provided by each of the viewing zones E1 to E9 in the retinal projection display 100 may be the same for all nine viewing angles (i.e., x=9), or may be different for each field of view. The finite viewing angle is, for example, 13° x 6.5°, 16° x 9°, or 20° x 12° as a horizontal viewing angle times a vertical viewing angle (i.e., (horizontal viewing angle)×(vertical viewing angle)).

Advantageous Effects of the Retinal Projection Display 100

Advantageous effects of the retinal projection display 100 is described.

In recent years, technologies and products relating to virtual reality (VR) and augmented reality (AR) are getting attention. In particular, the AR technology is expected to be applied to consumer and industrial fields as a means for presenting value-added digital information as an expansion of visualization of the real world. Glass-type image devices that can be used in various work environments for implementation are targets of product development.

Since a user visually recognizes a real world and an image (i.e., digital image) at the same time, a transmission-type (i.e., see-through) display is mainstream. An image display terminal that displays a virtual image in front of the eye through an eyepiece optical system including, for example, a partial reflection film or an image guide structure is put on the market.

However, in an image display terminal that displays a virtual image, since a user focuses on an image drawn at a fixed depth, a depth of the focal plane on which an object and an image in real space can be simultaneously focused is limited, and a natural action or work of a user is prevented.

By contrast, a retina drawing method using a laser directly drawing an image on the retina of the user has attracted attention in recent years. In the retinal drawing method using a laser, an image is focused on a pupil and projected on the retina by using the Maxwellian view.

Since light passing through the center of the pupil reaches the retina without being affected by the focus adjustment of the crystalline lens, a focus-free feature is obtained. The focus-free futures is independent of the user's visual acuity. In other words, an image is clearly visually recognized even if the focus is adjusted to any position of the outside world.

On the other hand, the retina drawing method has a disadvantage in which a viewing zone (i.e., eyebox) is relatively narrow due to a characteristic in which an image is once focused on a pupil. The viewing zone (i.e., eyebox) is a spatial region around the eyes in which the user can move the sight line without losing the image. In a situation where the viewing zone is narrow, the image may disappear due to a slight change in the sight line.

To handle such issues, a viewing zone expansion technique has been proposed (e.g., Japanese Patent No. 6769974) in recent years. In the viewing zone expansion technique, an optical system includes an exit pupil selector and a multiple hologram in an optical system and image light is collected on multiple positions. The viewing zone enlargement technique disclosed in Japanese Patent No. 6769974 is a technological candidate for providing a wearable head-mounted display with an enlarged viewing area, in which the viewing zone can be switched according to eye movement by duplication of the viewing zone or combination with eye tracking with the configuration described above.

However, in the viewing zone expansion technique described in Japanese Patent No. 6769974, since the pupil of the user and the collecting position of the image light are always aligned with each other, all the image light enters the pupil, and the entire display content is always kept visible in the field of view.

In an image display based on laser scanning, the resolution decreases as the viewing angle of an image desired to be viewed for a user increases. Since an arrangement of the exit pupil selector is changed by translation or rotation, the seize of the exit pupil selector is hard to reduce. As a result, the size of the entire wearable head-up display is prevented from being reduced, and the design of the device worn by a user is impaired.

In addition, In the case of performing display tracking eye movement by switching the viewing zone, delay is a problem due to the nature accompanying changes in arrangement such as translation and rotation. As described above, there are still many problems to improve visual recognition performance as a display device and to simultaneously achieve design excellent in design properties as glasses.

BY contrast, the retinal projection display 100 (i.e., optical device) according to the present embodiment includes an image laser light source 1 (i.e., light source), a scanning mirror 4 that continuously deflects an image laser beam $L_i$ emitted from the image laser light source 1, and a deflection mirror 5 that deflects the scanned image laser beam $L_i$ so as to irradiate the retina 32 (i.e., image formation object) with the image laser beam $L_i$.

The retinal projection display 100 also includes a projection optical element 6 (i.e., reflector or hologram) disposed between the scanning mirror 4 and the retina 32. In addition, a controller 11 (i.e., control means) for controlling the scanning mirror 4 and the deflection mirror 5 is provided.

The scanning mirror 4 continuously deflects the image laser beam $L_i$ in a direction different from a deflection direction of the deflection mirror 5, and the controller 11 controls the deflection direction of the deflection mirror 5 and the deflection direction of the scanning mirror 4.

The controller 11 controls the deflection direction of the deflection mirror 5 and the deflection direction of the scanning mirror 4 and changes the position of the image formed by the scanned image laser beam $L_i$ so that the viewing zone of the image formed on the retina 32 is enlarged and the resolution of the image can be increased.

Figure 13:
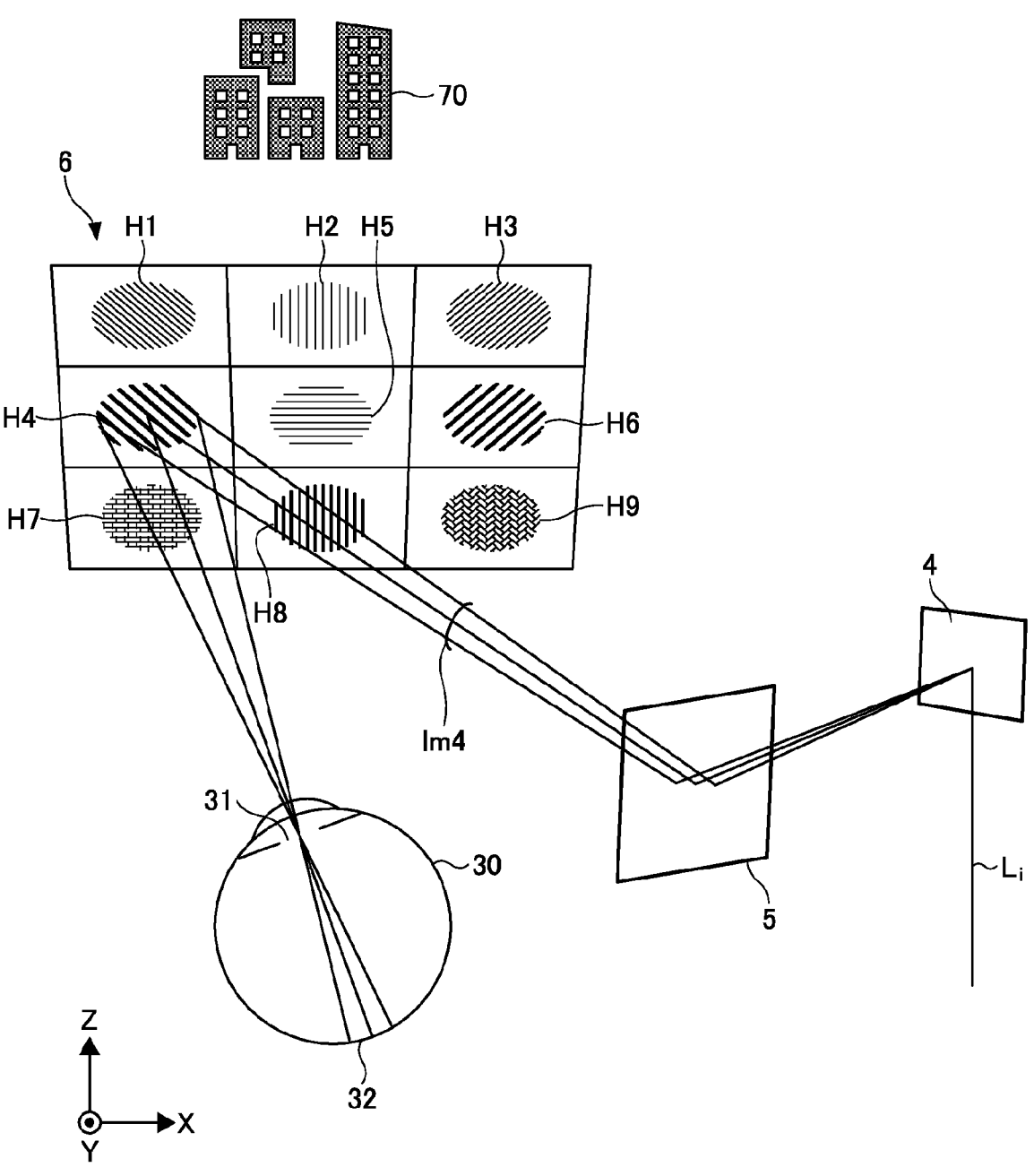
FIG. 13 is an illustration of advantageous effects of a retinal projection display according to the first embodiment.

FIG. 13 is an illustration of the operation and effect of the retinal projection display 100.

In FIG. 13, an image laser beam $L_i$ is continuously deflected by the scanning mirror 4 to become image light Im. The image light Im is deflected by a deflection mirror 5 and then reaches a projection optical element 6. The image light Im is reflected by the projection optical element 6, is once collected in the vicinity of the center of the pupil 31 of the eyeball 30 of the user, and is projected onto the retina 32 of the user.

The user visually recognizes the image light Im projected on the retina 32. Light propagating in the −Z-direction from the object 70 in the real space is light having a wide wavelength band including a visible wavelength band. The projection optical element 6 has excellent transmittance because the hologram works for a very narrow wavelength as compared to the wavelength band of visible light.

Most of the light propagating from the real space toward the eyeball 30 of the user passes through the projection optical element 6 and reaches the retina 32. Accordingly, the image of the object 70 in the real space is visually recognized with sufficient brightness.

As described above, the user wearing the retinal projection display 100 visually recognizes the image and the image of the object 70 in the real space in parallel, and visually recognizes both the image and the image of the real space in a bright state. In addition, in the present embodiment, since an image is directly formed on the retina 32 of the user using the Maxwellian view, the user visually recognizes the image in parallel and clearly even if focus is set on any position in the real space.

By contrast, the retina drawing method using the Maxwellian view has a drawback that the viewing area is relatively narrow due to the characteristic that the image light Im is once focused on the pupil 31. In a situation where the viewing zone is narrow, an image may disappear due to a slight change in the sight line.

In the present embodiment, the deflection direction of the image light Im to the projection optical element 6 along the Y-direction is changed in three stages by controlling the drive voltage of the scanning mirror 4, and the deflection direction of the image light Im to the projection optical element 6 along the X-direction can be changed in three stages by controlling the drive voltage of the deflection mirror 5.

The deflection direction of the image light Im toward the projection optical element 6 is changed to nine directions with a combination of drive voltage control of the scanning mirror 4 and the deflection mirror 5. A user views nine field of views corresponding to nine viewing zones arranged in a 3×3 array. The user can visually recognize an image even if the user views any part of nine the field of views. As a result, a viewing area in which an image is visually recognized are enlarged in spite of the retina drawing method.

In addition, in the present embodiment, the sight-line-direction estimation unit 51 is provided and estimates the direction of the sight line of the user among nine viewing zones. The controller 11 controls the drive voltages of the scanning mirror 4 and the deflection mirror 5 so that the image is displayed in the estimated field of view, the user visually recognizes the image even if the user views any region of the nine field of views.

The user can view an image in one field of view to which the sight line is directed among nine fields of views. As a result, an image is displayed at the position to which the sight line is directed within the nine field of views, and an image is projected ahead the sight line with tracking the sight line.

An images projected onto each of nine field of views may be the same or different. For example, assuming that the image is the same regardless of the switching of the viewing zone, the same image can be always displayed tracking the sight line as long as the image is within the nine field of views.

The embodiment of the present invention is useful for on-site support in, for example, a manufacturing industry in which information is desired to be displayed ahead of the sight line, and for use by general consumers to check information of an object that the consumer looks at in daily life.

Further, in a case where different images are displayed in each of field of views, for example, information or data to be displayed ahead of the sight line is determined and set in advance, so that the information can be confirmed by directing the sight line to the set field of view at any time.

In other words, a video experience that depends on the user's intention to watch when the user wants to watch the video can be provided. However, the video experience cannot be achieved by the viewing zone duplication technique often found in the conventional disclosed technique. Accordingly, in a case where the user is a manufacturing worker or an infrastructure inspection worker, the work in the real space is not hindered by a clear field of view, the digital content such as a work instruction can be favorably visually recognized only when the sight line is moved at a proper timing, and the work can be performed without visual stress by focus-free. Thus, the efficiency of the work is expected to be higher than ever.

Further, in the present embodiment, the viewing angle of the image formed by the scanning mirror 4 remains within one field of view. The viewing angle is switched by controlling the drive voltages of the scanning mirror 4 and the deflection mirror 5, within the field of view in which the sight line of the user directed among nine viewing zones. The resolution does not change depending on the field of view, and the resolution for scanning within one field of view is maintained in any field of view.

In general, in image display based on laser scanning, the resolution decreases as the viewing angle of an image desired to be displayed to a user increases. However, in the retinal projection display 100, a region in which a display can be seen and a viewing zone are enlarged, and a field of view on which an image can be projected is enlarged without deteriorating the resolution.

In addition, in the present embodiment, since the viewing zone is switched by controlling the drive voltages of the scanning mirror 4 and the deflection mirror 5 which are MEMS mirrors having a minute size, a mechanism or a device using a physical operation is not applied. As a result, the optical system is simplified, and the retinal projection display is significantly miniaturized.

Second Embodiment

A retinal projection display 100a according to a second embodiment is described. When the drive voltages C and D including the DC voltage are applied in parallel to the deflection mirror 5 as differential signals (i.e., opposite-phase signals), the deflection mirror 5 oscillates in accordance with the natural frequency of the deflection mirror 5, and the image displayed on the retinal projection display 100 may vibrate until the vibration stops. In the present embodiment, such vibration of the deflection mirror 5 is reduced by controlling the drive voltage.

FIG. 14A is an timing chart of time, voltage, and a deflection angle of the deflection mirror 5 in which a second embodiment is not applied as a comparative example. FIG. 14B is a timing chart of time, voltage, and deflection angle of deflection mirror in which the second embodiment is applied.

In FIG. 14A, a damped oscillation 111 occurs when the tilt of the movable portion 42 changes from an angle θR to an angle θL in response to the application of the drive voltages C' and D' according to the comparative example. The damped oscillation 111 converges after the time t, and the deflection angle of the movable portion 42 is stabilized. During the time t, the image displayed on the retinal projection display 100 oscillates.

In the present embodiment, as illustrated in FIG. 14B, a predetermined time difference Δt is provided between a timing at which the voltage value of the drive voltage C as the first drive voltage changes and a timing at which the voltage value of the drive voltage D as the second drive voltage changes. As a result, the oscillation caused by the change in the drive voltage C and the oscillation caused by the change in the drive voltage D are cancelled out. Thus, the damped oscillation of the movable portion 42 is reduced. For example, when a time that is approximately half the natural period of the deflection mirror 5 is given as the time difference Δt, the oscillation is preferably reduced.

In the example of FIG. 14B, the drive voltage D changes after the drive voltage C changes, but the drive voltage C may change after the drive voltage D changes. The time difference Δt is given to the rising timing of the drive voltage in FIG. 14B. The same effect is obtained when the time difference Δt is given to the falling timing.

The waveforms of the drive voltages C and D are also not particularly limited, and similar effects can be obtained by applying the time difference Δt to a waveform that switches instantaneously or changes exponentially, in addition to the ramp-like shape as illustrated in FIG. 14B.

Other functions and effects are the same as those described in the first embodiment.

Although the retinal projection display according to the embodiment has been described above, the present invention is not limited to the embodiment described above, and various modifications and improvements are possible within the scope of the present invention.

Although the retinal projection display has been described as an example of an optical device in embodiment described above, the optical device may be a head-mounted display that is directly mounted on the head of a "user", and is indirectly mounted on the head of the "user" via a member such as a fixing portion.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

REFERENCE SIGNS LIST

1 Image laser light source
2, 3 Lens
4 Scanning mirror (Light scanner)
5 Deflection mirror (Light deflector)
6 Projection optical element (Reflector)
7 Detection laser light source
8 Light detection element
9 Reflection element
10 Eyeglass frame
101 Temple
102 Rim
103 Eyeglass lens
11 Controller
30 Eyeball
31 Pupil
32 Retina (Image formation object)
51 Sight-line-direction estimation unit
52 Image formation control unit
53 Light source control unit
54 Light scanner control unit
55 Light deflector control unit
73, 83 Surface (Multiple projectable regions)
74, 84 Projection region
75, 85 Non-projection region
A, B Drive voltage
$S_{L1}$ Formation drive signal
$S_{L2}$ Detection drive signal
Dat Image data
$L_i$ Image laser beam
$L_S$ Detection laser beam
$S_S$ Scanning drive signal
$S_T$ Deflection drive signal
$S_D$ Detection signal (projection position information or image formation object position information)
H1 to H9 Hologram region
L1 to L9 Emission region
E1 to E9 Viewing zone
The invention claimed is:

1. An optical device, comprising:
a light source to emit light;
a light scanner to deflect the light emitted from the light source to scan an image formation object with the light through a light deflector;
the light deflector to deflect the light emitted from the light scanner to the image formation object;
a reflector between the light scanner and the image formation object, wherein the reflector includes a plurality of projection regions arranged in an array on a surface of the reflector along a first direction and a second direction orthogonal to the first direction, and the light scanner scans the light within one projection region of the plurality of projection regions; and
circuitry configured to:
control the light deflector to deflect the light emitted from the light scanner in a first deflection direction, and to shift a position of the light from one projection region of the plurality of projection regions to another projection region of the projection regions along the first direction; and control the light scanner to deflect the light emitted
from the light source in a second deflection direction
different from the first deflection direction, and to
shift the position of the light from one projection
region of the plurality of projection regions to
another projection region of the projection regions
along the second direction.

2. The optical device according to claim 1, wherein the
circuitry controls the light scanner and the deflection direc-
tion to change the first deflection direction and the second
deflection direction to form a non-projection region on the
plurality of projection regions.

3. The optical device according to claim 1, wherein the
reflector includes a light reflecting-condensing element in
each projection region of the plurality of projection regions,
the light reflecting-condensing element configured to reflect
and condense light.

4. The optical device according to claim 3, wherein the
light reflecting-condensing element is a hologram.

5. The optical device according to claim 1, wherein the
light scanner scans the image formation object with the light
to form different images on the image formation object.

6. The optical device according to claim 1, further com-
prising:
    projection position output circuitry configured to output at
        least one of positional information of projection and
        positional information of the image formation object to
        the circuitry, wherein
    the circuitry controls the light scanner and the light
        deflector based on the at least one of the positional information of projection and the positional informa-
tion of the image formation object.

7. The optical device according to claim 1, further com-
prising:
    projection information output circuitry configured to out-
        put projection information to the light source.

8. The optical device according to claim 1, further com-
prising:
    a detector to detect a sight-line-direction, wherein
    the image formation object is at least one of a retina and
        a pupil of the eyeball, and
    at least one of the light scanner and the light deflector
        deflects the light based on the sight-line-direction.

9. The optical device according to claim 8, wherein the
circuitry adjusts a drive voltage of at least one of the light
scanner and the light deflector to control the at least one of
the light scanner and the light deflector.

10. The optical device according to claim 1, wherein to
control the light deflector, the circuitry is configured to:
    apply a first drive voltage to the light deflector;
    apply a second drive voltage to the light deflector; and
    change an amount of time between a timing at which a
        voltage value of the first drive voltage is adjusted and
        a timing at which a voltage value of the second drive
        voltage is adjusted.

11. A retinal projection display comprising the optical
device according to claim 1.

12. A head-mounted display comprising the optical device
according to claim 1.

\* \* \* \* \*